(12) United States Patent
Tada et al.

(10) Patent No.: US 8,297,504 B2
(45) Date of Patent: Oct. 30, 2012

(54) MANAGING PRINTABLE MEDIA THAT INCLUDE ELECTRONIC TAGS

(75) Inventors: Masami Tada, Sagamihara (JP); Keiji Satoh, Yamato (JP)

(73) Assignee: International Business Machines Corporation, Armonk, NY (US)

(*) Notice: Subject to any disclaimer, the term of this patent is extended or adjusted under 35 U.S.C. 154(b) by 452 days.

(21) Appl. No.: 12/488,273

(22) Filed: Jun. 19, 2009

(65) Prior Publication Data

US 2010/0006647 A1 Jan. 14, 2010

(30) Foreign Application Priority Data

Jul. 10, 2008 (JP) ................................. 2008-180537

(51) Int. Cl.
*G06F 19/00* (2011.01)
*G06Q 30/00* (2012.01)
*G06Q 90/00* (2006.01)

(52) U.S. Cl. ........ 235/385; 235/375; 235/383; 235/487; 235/492

(58) Field of Classification Search .................. 235/375, 235/383, 385, 435, 487
See application file for complete search history.

(56) References Cited

U.S. PATENT DOCUMENTS

| | | | |
|---|---|---|---|
| 6,545,767 B1 * | 4/2003 | Kuroyanagi | 358/1.14 |
| 2003/0212757 A1 * | 11/2003 | Niikura et al. | 709/217 |
| 2004/0041696 A1 * | 3/2004 | Hull et al. | 340/10.42 |
| 2004/0078749 A1 * | 4/2004 | Hull et al. | 715/500 |
| 2004/0193742 A1 * | 9/2004 | Ikeda | 710/1 |
| 2004/0257601 A1 * | 12/2004 | Tomiyasu et al. | 358/1.9 |
| 2007/0177219 A1 * | 8/2007 | Shinozaki et al. | 358/304 |
| 2007/0211288 A1 * | 9/2007 | Uejo et al. | 358/1.16 |
| 2007/0230750 A1 * | 10/2007 | Ikeda et al. | 382/123 |
| 2008/0074707 A1 * | 3/2008 | Cranitch et al. | 358/403 |
| 2009/0072019 A1 * | 3/2009 | Shibata et al. | 235/375 |

FOREIGN PATENT DOCUMENTS

| | | | |
|---|---|---|---|
| JP | 2002-120475 A | 4/2002 | |
| JP | 2005-35095 A | 2/2005 | |

* cited by examiner

*Primary Examiner* — Ali Sharifzada
(74) *Attorney, Agent, or Firm* — David A. Dagg

(57) ABSTRACT

The system includes a first receiver that, when information has been printed on the medium using a printing apparatus, receives, from the printing apparatus, an electronic tag ID of an electronic tag in the printed medium and a plurality of recipient IDs specified by a user, a second receiver that, when the printed medium has been stored in a repository, receives, from the repository, an electronic tag ID of an electronic tag in the stored medium and an ID in association with the repository (hereinafter called the repository ID), and an associating unit that, when the electronic tag ID sent from the printing apparatus agrees with the electronic tag ID sent from the repository, associates a recipient ID corresponding to the repository ID sent from the repository, out of the plurality of recipient IDs sent from the printing apparatus, with the agreed electronic tag ID.

21 Claims, 14 Drawing Sheets

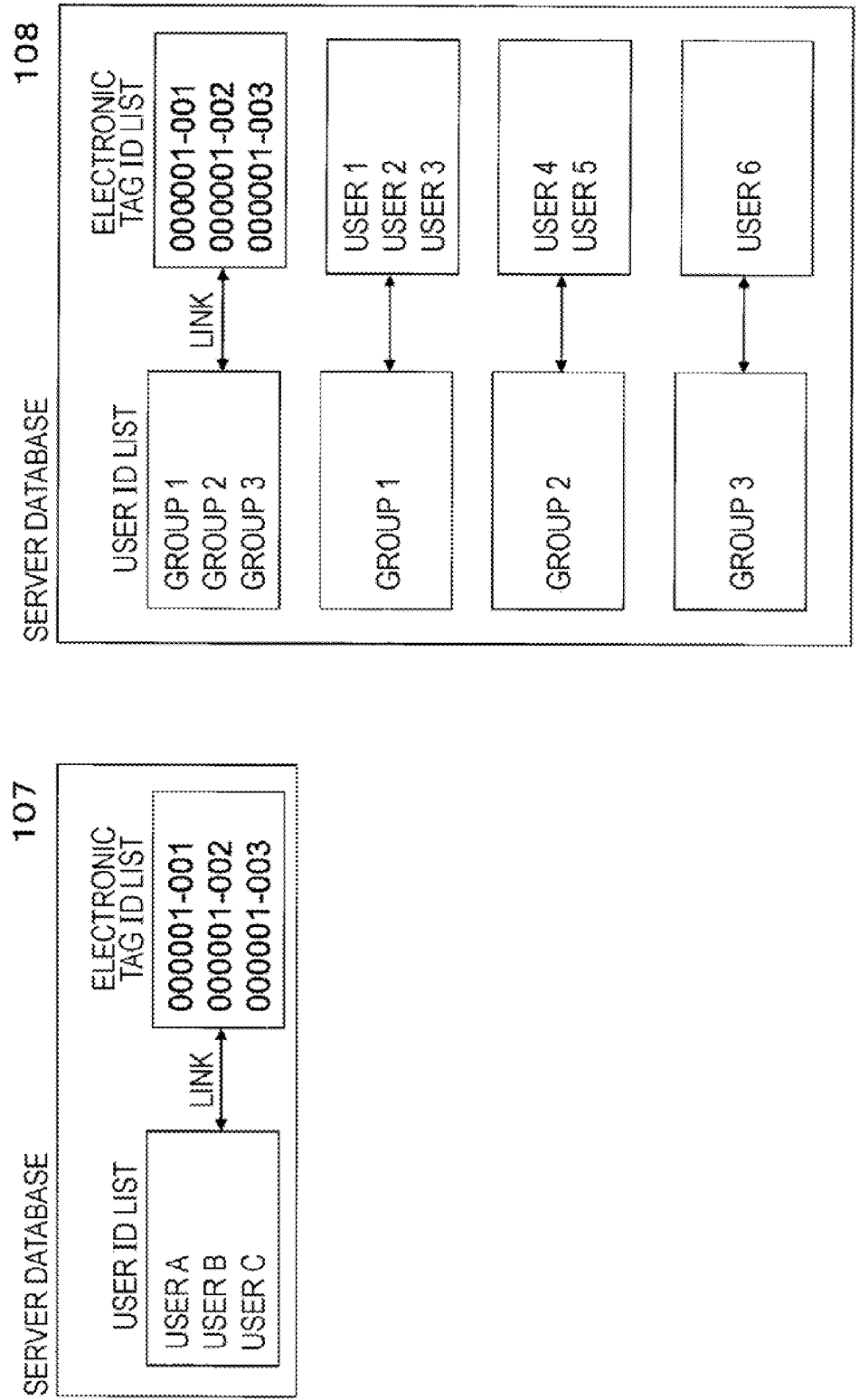

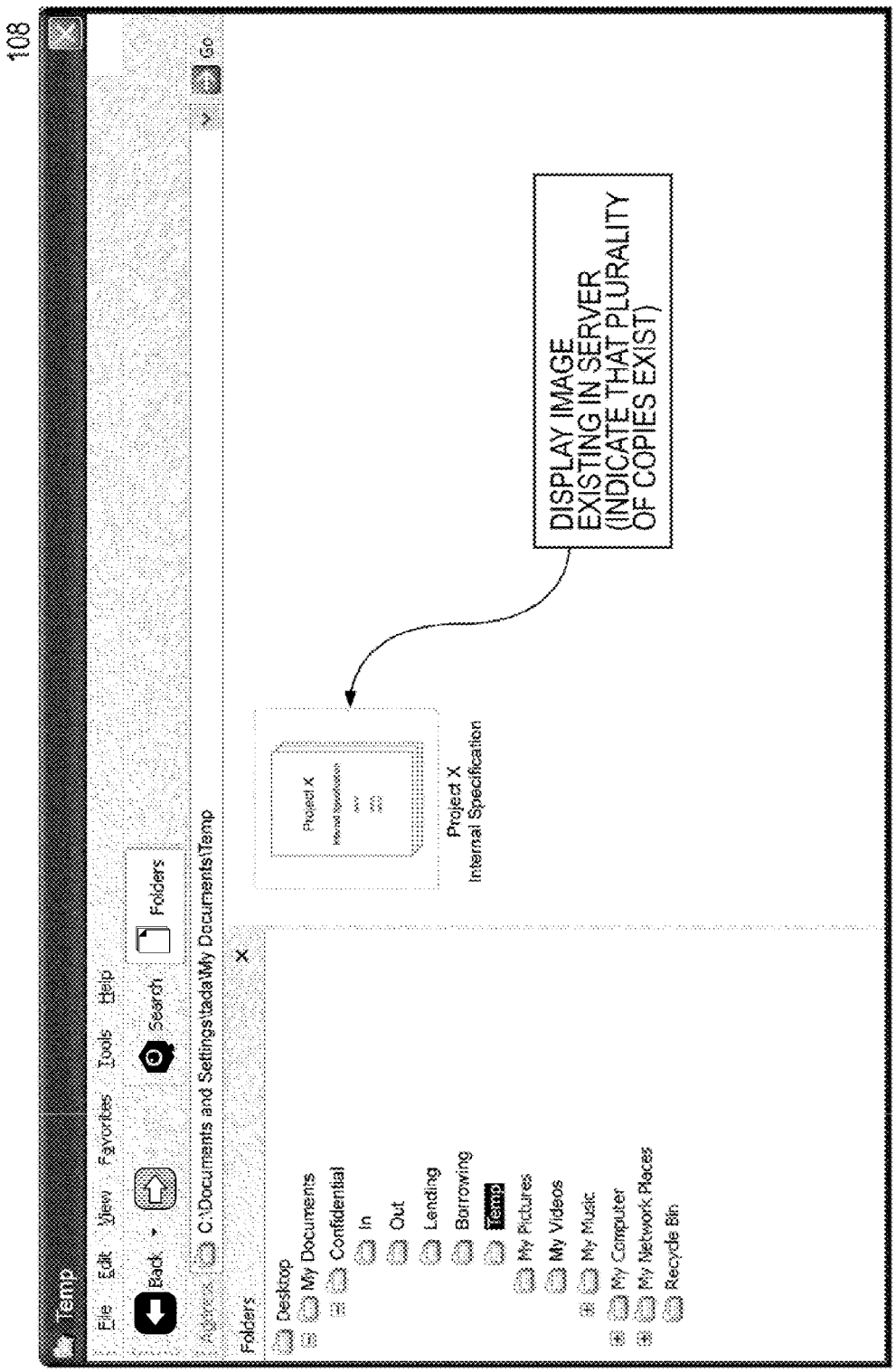

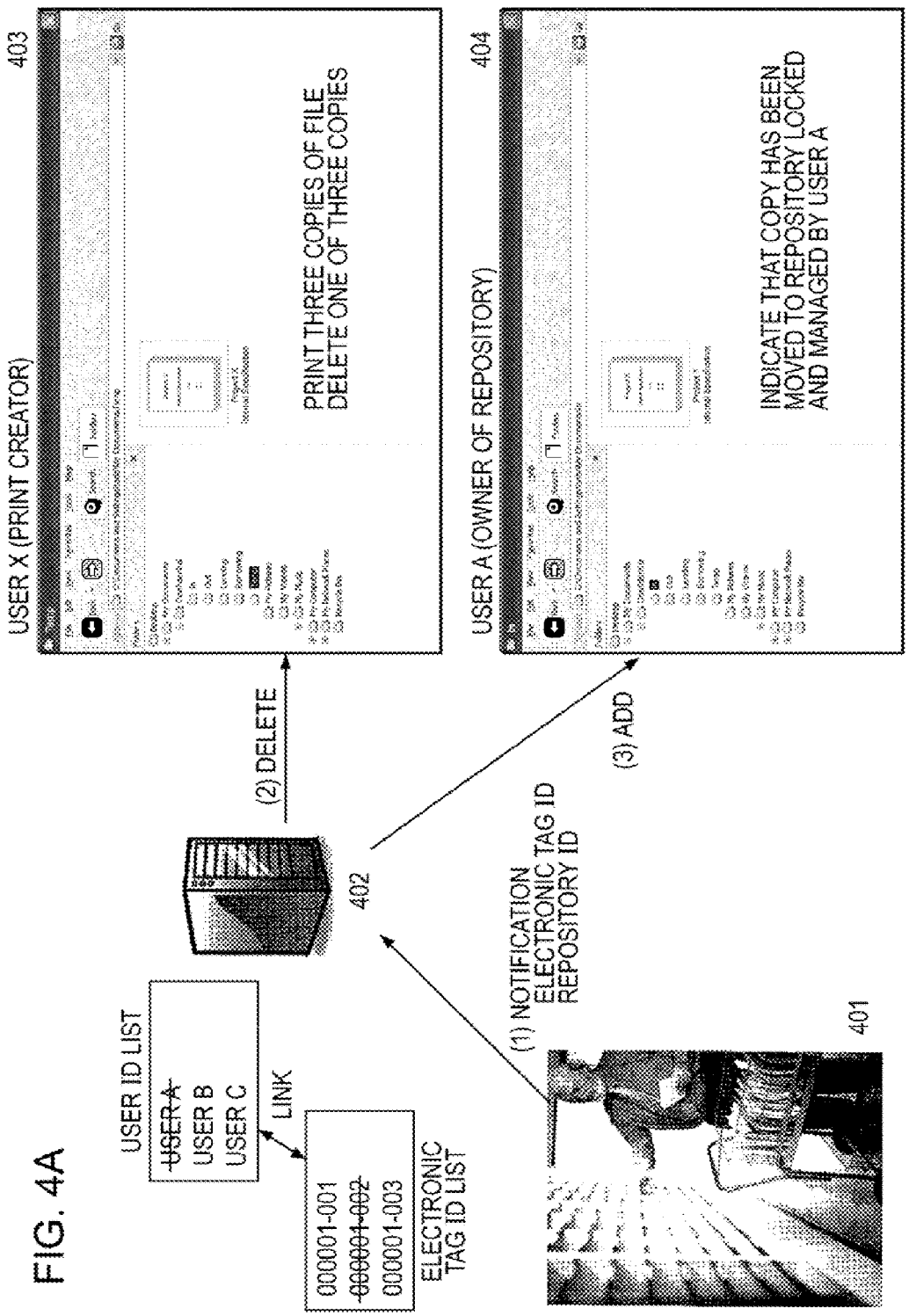

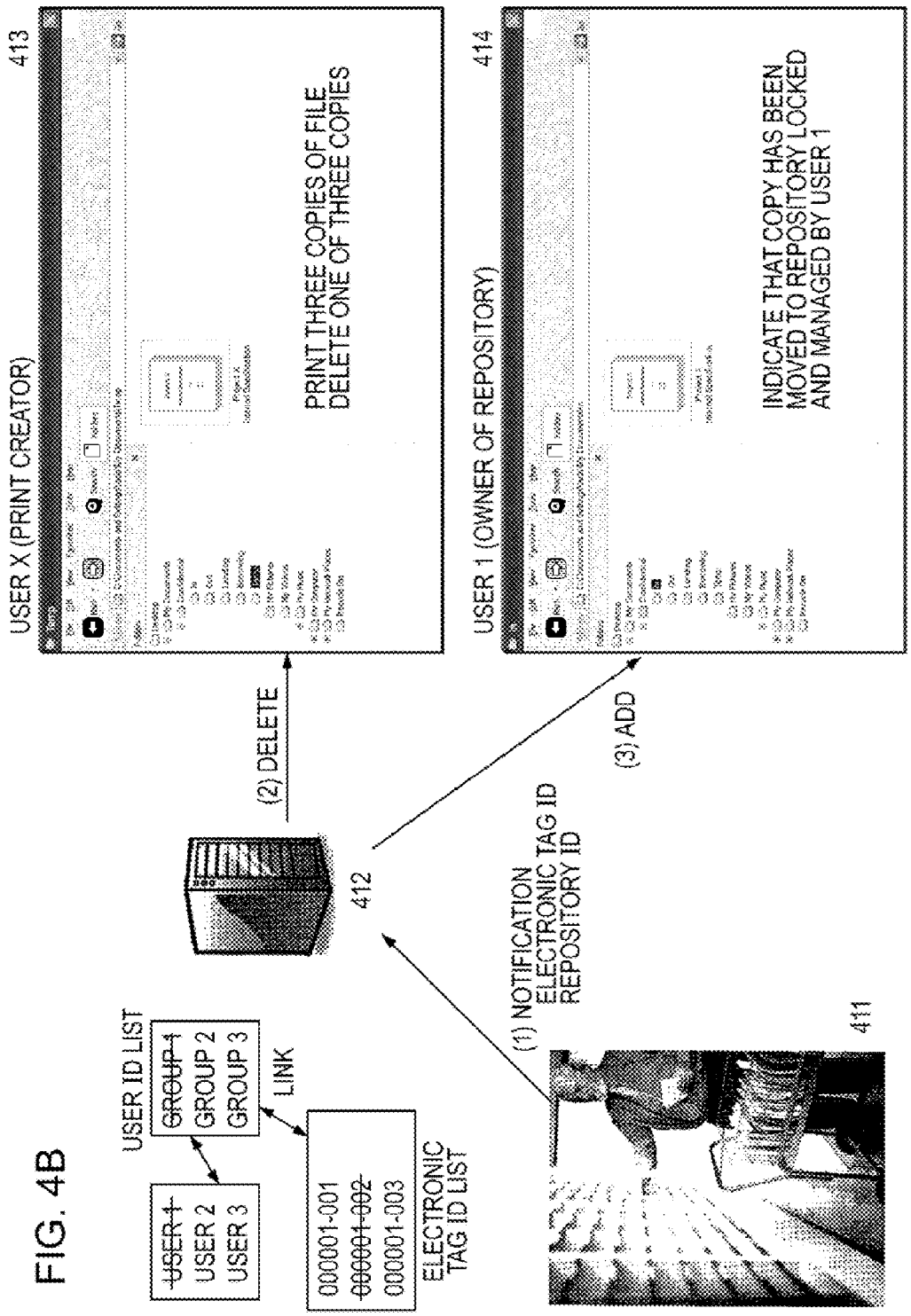

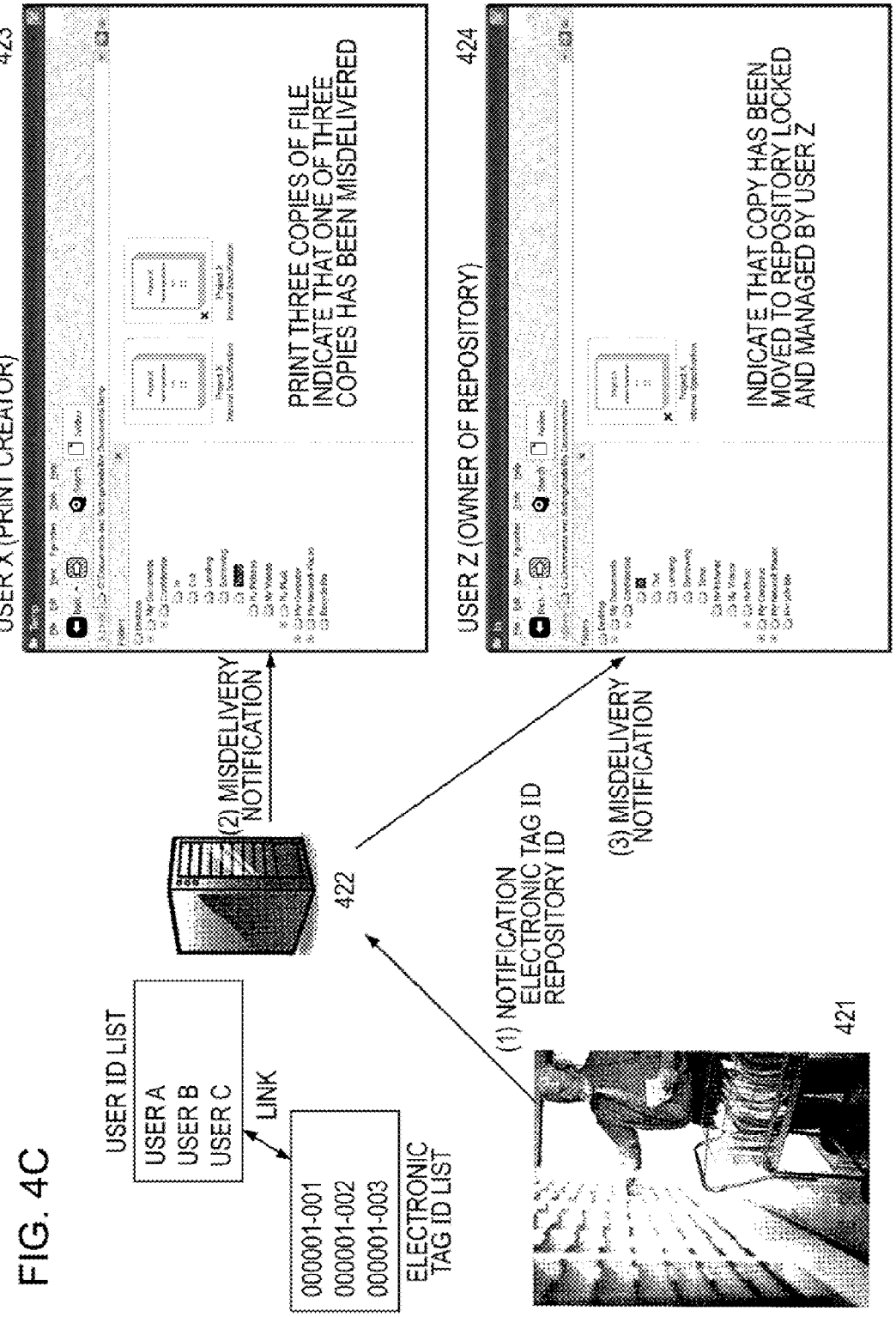

MANAGING PRINTABLE MEDIA THAT INCLUDE ELECTRONIC TAGS

CROSS REFERENCE TO RELATED APPLICATIONS

The present application claims priority from Japanese Application Number 2008-180537, filed in Japan on Jul. 10, 2008, the contents of which are incorporated herein by reference.

FIELD OF THE INVENTION

The present invention relates to a server system, a method, and a computer program product for managing printable media that include electronic tags. The present invention further relates to a media management system that manages printable media that include electronic tags and a method for managing the media, which include electronic tags, in the media management system.

BACKGROUND OF THE INVENTION

Hitherto, the development of tiny electronic tags has been advanced, so that techniques for weaving electronic tags into, for example, paper fibers have been available. The use of electronic tags ensures traceability. Traceability enables checking of the current place of an object.

Management of confidential information in digital form is being achieved by holding information in electronic form. However, in practice, confidential information is still exchanged using paper media. In methods for managing paper media, paper media are generally filed in cabinets that can be locked. However, for example, failure to file paper media and leaving paper media cause problems. Thus, a new method for managing confidential information for paper media is required.

Japanese Unexamined Patent Application Publication No. 2002-120475 discloses management of documents in which documents can be identified and managed at the sheet level using identifiers assigned to sheets.

Japanese Unexamined Patent Application Publication No. 2005-35095 discloses that, when a plurality of sets of printed materials are created, printing is performed for each of the sets of printed materials using sheets, a radio frequency identification tag being embedded only in a randomly determined page of the sheets, and records are kept so that an embedded radio frequency identification tag is association with a corresponding printed document.

Problems with existing solutions relate to the fact that when a user sends paper media that include electronic tags to destinations, the user needs to specify the destination of each paper medium. Moreover, traceability achieved by electronic tags ensures tracing of the distribution route and current place of a printed material but cannot determine whether the ownership of the printed material is assigned or the printed material is lent.

SUMMARY OF THE INVENTION

A first embodiment of the present invention provides a server system that manages a printable medium including an electronic tag. The server system includes a first receiver that, when information has been printed on the medium using a printing apparatus, receives, from the printing apparatus, an electronic tag ID of an electronic tag in the printed medium and a plurality of recipient IDs specified by a user. The server system also includes a second receiver that, when the printed medium has been stored in a repository, receives, from the repository, an electronic tag ID of an electronic tag in the stored medium and an ID in association with the repository (hereinafter called the repository ID), and an associating unit that, when the electronic tag ID sent from the printing apparatus agrees with the electronic tag ID sent from the repository, associates a recipient ID corresponding to the repository ID sent from the repository, out of the plurality of recipient IDs sent from the printing apparatus, with the agreed electronic tag ID.

In the first embodiment of the present invention, the server system may further include a transmitter that, when the plurality of recipient IDs sent from the printing apparatus do not include the recipient ID corresponding to the repository ID sent from the repository, sends a message indicating misdelivery to at least one of the printing apparatus, a computer in association with the user who has performed the printing, and a computer for an administrator in association with the repository.

In the first embodiment of the present invention, the server system may further include a third receiver that, when the medium has been inserted into a shredder, receives an electronic tag ID in the medium from the shredder, a determination unit that determines whether disposal of the medium with the received electronic tag ID is allowed, and a transmitter that sends, to the shredder, a message stating that the disposal is allowed when the disposal is allowed and sends, to the shredder, a message stating that the disposal is not allowed when the disposal is not allowed.

In the first embodiment of the present invention, one of the recipient IDs sent from the printing apparatus may include a flag indicating that the printed medium is assigned or lent to a user of the recipient repository.

In the first embodiment of the present invention, the first receiver may receive an owner ID of the medium from the printing apparatus.

In the first embodiment of the present invention, when a flag indicating that the printed medium is assigned to the user of the recipient repository is included, the associating unit may replace the owner ID of the medium sent from the printing apparatus with the recipient ID corresponding to the repository ID sent from the repository.

A second embodiment of the present invention provides a media management system that manages a printable medium including an electronic tag. The media management system includes a printing apparatus that includes a transmitter that, when information has been printed on the medium, sends, to a server system, an electronic tag ID of an electronic tag in the printed medium and a plurality of recipient IDs specified by a user, and a repository that stores the printed medium, includes a reader reading an electronic tag ID from an electronic tag in the stored medium, and includes a transmitter sending, to the server system, the read electronic tag ID and an ID in association with the repository (hereinafter called the repository ID).

The server system includes an associating unit that, when the electronic tag ID sent from the printing apparatus agrees with the electronic tag ID sent from the repository, associates a recipient ID corresponding to the repository ID sent from the repository, out of the plurality of recipient IDs sent from the printing apparatus, with the agreed electronic tag ID.

In the second embodiment of the present invention, the server system may further include a transmitter that, when the plurality of recipient IDs sent from the printing apparatus do not include the recipient ID corresponding to the repository ID sent from the repository, sends a message indicating misdelivery to at least one of the printing apparatus, a computer in association with the user who has performed the printing, and a computer for an administrator in association with the repository.

In the second embodiment of the present invention, the media management system may further include a shredder.

The shredder may include a transmitter that, when the medium has been inserted into the shredder, sends an electronic tag ID in the medium to the server system.

The server system may further include a determination unit that receives the electronic tag ID sent from the shredder and determines whether disposal of the medium with the received electronic tag ID is allowed, and a transmitter that sends, to the shredder, a message stating that the disposal is allowed when the disposal is allowed and sends, to the shredder, a message stating that the disposal is not allowed when the disposal is not allowed.

The shredder may cut the inserted medium upon receiving the message stating that the disposal is allowed and may not cut the inserted medium upon receiving the message stating that the disposal is not allowed.

In the second embodiment of the present invention, the printing apparatus may further include a setting unit that allows an owner of the medium to set whether disposal of the medium is allowed.

In the second embodiment of the present invention, the repository may further include a setting unit that allows an owner in association with the repository to set whether disposal of the medium is allowed.

In the second embodiment of the present invention, one of the recipient IDs sent from the printing apparatus may include a flag indicating that the printed medium is subjected to assignment or lending.

In the second embodiment of the present invention, the transmitter in the printing apparatus may further send, to the server system, at least one of a name of the user who has performed the printing, a user ID of the user who has performed the printing, print date and time, an ID of the printing apparatus, and a lending period of the printed medium.

In the second embodiment of the present invention, the printing apparatus may further include a receiver that receives the plurality of recipient IDs specified by the user from a client computer that may be connected to the printing apparatus.

In the second embodiment of the present invention, the printing apparatus may further include an imaging unit that images the printed information, and the transmitter therein may further send the imaged information to the server system.

In the second embodiment of the present invention, the printing apparatus may further include an input unit that allows specification of a plurality of recipients to which the medium is distributed.

In the second embodiment of the present invention, the printing apparatus may be a printer, a copier, or a multifunction device.

A third embodiment of the present invention provides a method in which a server system performs the following steps to manage a printable medium that includes an electronic tag. The method includes a step of, when information has been printed on the medium using a printing apparatus, receiving, from the printing apparatus, an electronic tag ID of an electronic tag in the printed medium and a plurality of recipient IDs specified by a user. The method further includes a step of, when the printed medium has been stored in a repository, receiving, from the repository, an electronic tag ID of an electronic tag in the stored medium and an ID in association with the repository (hereinafter called the repository ID), and a step of, when the electronic tag ID sent from the printing apparatus agrees with the electronic tag ID sent from the repository, associating a recipient ID corresponding to the repository ID sent from the repository, out of the plurality of recipient IDs sent from the printing apparatus, with the agreed electronic tag ID.

In the third embodiment of the present invention, the method may further include a step of, when the plurality of recipient IDs sent from the printing apparatus do not include the recipient ID corresponding to the repository ID sent from the repository, sending a message indicating misdelivery to at least one of the printing apparatus, a computer in association with the user who has performed the printing, and a computer for an administrator in association with the repository.

In the third embodiment of the present invention, the method may further include a step of, when the medium has been inserted into a shredder, receiving an electronic tag ID in the medium from the shredder, a step of determining whether disposal of the medium with the received electronic tag ID is allowed, and a step of sending, to the shredder, a message stating that the disposal is allowed when the disposal is allowed and sending, to the shredder, a message stating that the disposal is not allowed when the disposal is not allowed.

A fourth embodiment of the present invention provides a method for managing a printable medium including an electronic tag in a system that manages the medium. The method includes a step in which, when information has been printed on the medium, a printing apparatus sends, to a server system, an electronic tag ID of an electronic tag in the printed medium and a plurality of recipient IDs specified by a user, a step in which a repository that stores the printed medium reads an electronic tag ID from an electronic tag in the stored medium and sends, to the server system, the read electronic tag ID and an ID in association with the repository (hereinafter called the repository ID), and a step in which, when the electronic tag ID sent from the printing apparatus agrees with the electronic tag ID sent from the repository, the server system associates a recipient ID corresponding to the repository ID sent from the repository, out of the plurality of recipient IDs sent from the printing apparatus, with the agreed electronic tag ID.

In the fourth embodiment of the present invention, the method may further include a step in which, when the plurality of recipient IDs sent from the printing apparatus do not include the recipient ID corresponding to the repository ID sent from the repository, the server system sends a message indicating misdelivery to at least one of the printing apparatus, a computer in association with the user who has performed the printing, and a computer for an administrator in association with the repository.

In the fourth embodiment of the present invention, the method may further include a step in which, when the medium has been inserted into a shredder that cuts the medium, the shredder sends an electronic tag ID in the medium to the server system, a step in which the server system receives the electronic tag ID sent from the shredder and determines whether disposal of the medium with the received electronic tag ID is allowed, a step in which the server system sends, to the shredder, a message stating that the disposal is allowed when the disposal is allowed, a step in which the server system sends, to the shredder, a message stating that the disposal is not allowed when the disposal is not allowed, a step in which the shredder cuts the inserted medium upon receiving the message stating that the disposal is allowed, and a step in which the shredder does not cut the inserted medium upon receiving the message stating that the disposal is not allowed.

A fifth embodiment of the present invention provides a computer program product for managing a printable medium including an electronic tag. The computer program product causes the server system to perform individual steps according to any one of the aforementioned methods.

Advantageously, in the embodiments of the present invention, when a plurality of printed materials including electronic tags are distributed, a destination need not be specified for each of the printed materials. In the embodiments of the present invention, a plurality of destinations can be assigned to a plurality of printed materials. In other words, a plurality of destinations are assigned to each printed material.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 1B shows a database in a server in an embodiment of the present invention.

FIG. 1C shows an exemplary GUI interface in an embodiment of the present invention.

FIG. 4A shows the outline of how an electronic tag ID is associated with a user ID by putting a printed material in a repository in an embodiment of the present invention.

FIG. 4B shows the outline of how an electronic tag ID is associated with the user ID of a user that belongs to a group by putting a printed material in a repository in an embodiment of the present invention.

FIG. 4C shows the outline of a case where a printed material is misdelivered and put in a repository in an embodiment of the present invention.

DETAILED DESCRIPTION OF EXEMPLARY EMBODIMENTS

Figure 1A:
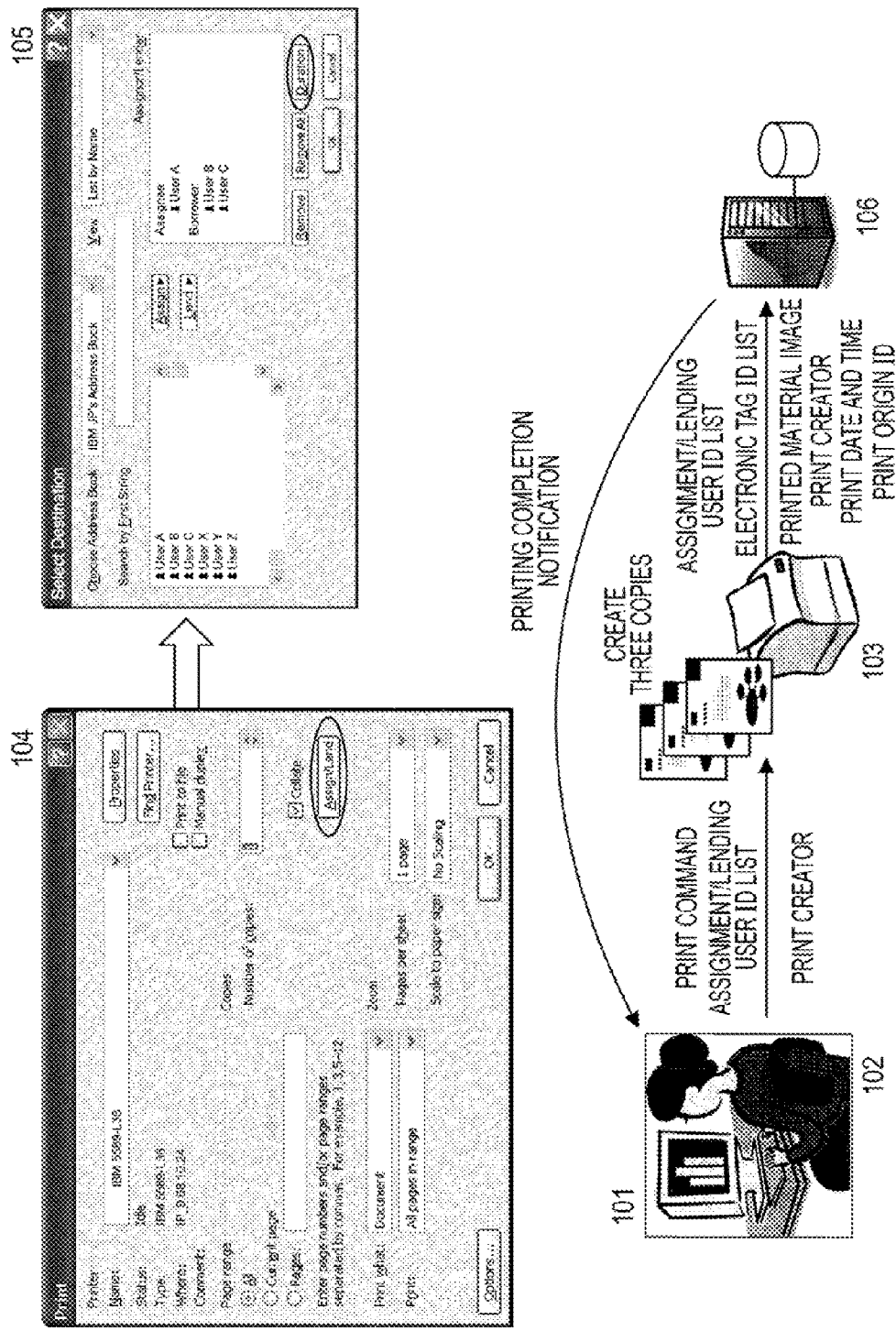
FIG. 1A shows the outline of how a client user determines recipient IDs when printing is performed using a printer in an embodiment of the present invention.

An electronic tag is also called an IC tag or a radio frequency identification (RFID) tag. In an electronic tag, little electrical power is generated in the circuit by radio waves emitted from an electronic tag reader, information is processed using the electrical power, and the information is sent to the electronic tag reader by air. Mainly, an electronic tag ID is exchanged between the electronic tag and the electronic tag reader.

In an embodiment of the present invention, as long as a tag is an electronic tag, any communication system, storage system, power system, shape and communication range may be adopted. Communication systems include, for example, the electromagnetic coupling type, the electromagnetic induction type, and the microwave type. Storage systems include, for example, the read only type, the write once read many type, and the read write type. Power systems include, for example, the passive type and the active type. Shapes include, for example, a label shape, a card shape, a stick shape, and a coin shape. In an embodiment of the present invention, an electronic tag may have any shape as long as the electronic tag can be built in a medium. An electronic tag may be of any size as long as the size does not cause any problem in printing. The size of an electronic tag is, for example, equal to or less than 2 mm. The types of the communication range between an electronic tag and an electronic tag reader include, for example, the close coupling type, the proximity coupling type, the vicinity coupling type, and the remote coupling type. In an embodiment of the present invention, as long as an electronic tag reader is located in a range in which an electronic tag embedded in a medium can communicate with the electronic tag reader, any communication range may be acceptable.

In an embodiment of the present invention, media include various types of media of any material and shape as long as the media can be printed. In an embodiment of the present invention, printable media include, but not exclusively, paper media, cloth media, plastic media, metallic media, and disk media.

Paper media include various types of paper of any material and shape. In an embodiment of the present invention, paper media include, but not exclusively, paper used in offices, for example, copying paper, printing paper, post cards, and filing paper, and books.

Cloth media include various types of cloths of any material and shape. In an embodiment of the present invention, cloth media include, but not exclusively, for example, clothing such as T-shirts and handkerchiefs.

Plastic media include various types of plastic of any material and shape. In an embodiment of the present invention, plastic media include, but not exclusively, for example, stretch-thinned plastic, plastic strips, and various types of cards such as bank cards, credit cards, and membership cards.

Metallic media include various types of metals of any material and shape. In an embodiment of the present invention, metallic media include, but not exclusively, for example, stretch-thinned metals and metal strips.

Disk media include, but not exclusively, CDs, DVDs, BDs, and magneto-optical disks.

Electronic tags may be built in the aforementioned media using a common method.

In an embodiment, for example, an electronic tag is embedded in a medium. In another embodiment, for example, an electronic tag is attached on a surface of a medium. However, an electronic tag is preferably embedded in a medium, considering the influence on printing apparatuses exerted when the medium is printed.

An electronic tag may be embedded in or attached to any position in a medium, for example, any one of the four corners of the medium, as long as the electronic tag does not disturb printing. One electronic tag is preferably embedded in each group of media. For example, in the case of paper media, one group of paper media may include one paper medium that includes an electronic tag and the other paper media that include no electronic tag. One group of paper media is, for example, one group of media bound by a stapler. In one group of paper media, a paper medium that includes an electronic tag is, but not exclusively, for example, a front cover. One group of paper media may be created by a printing apparatus that includes a tray holding paper media including electronic tags and a tray holding paper media including no electronic tag. In response to an instruction to print one group of paper media, the printing apparatus may pick a paper medium from the tray holding paper media including electronic tags and perform printing for the first one of the paper media in the group and then pick paper media from the tray holding paper media including no electronic tag and perform printing for the other paper media in the group. A mark for identifying that an electronic tag is embedded in a medium may be put on the medium. For example, in an embodiment, a frame mark may be put on a position in a medium in which an electronic tag is embedded.

In a case where an electronic tag is embedded in a medium, in a phase in which the medium is manufactured, the electronic tag is embedded in the medium. In a case where a medium is a paper medium, in a phase in which the medium is manufactured, the electronic tag is embedded in the paper medium. In a case where an electronic tag is attached to a medium, for example, in a phase in which the medium is manufactured, a phase in which the medium is distributed, or a phase in which information is printed on the medium, the electronic tag may be attached to the medium.

An electronic tag includes a unique identifier for uniquely identifying a medium (hereinafter called an electronic tag ID). An electronic tag ID may be assigned in a phase in which an electronic tag is manufactured, a phase in which a medium including an electronic tag is manufactured, a phase in which a medium including an electronic tag is distributed, or a phase in which a printing apparatus prints information on a medium. In any of these phases, a writer that writes electronic tag IDs is used to write an electronic tag ID to an electronic tag.

In an embodiment of the present invention, typically, printing apparatuses include, but not exclusively, a printer, a copier, and a multifunction device. A multifunction device includes at least one of a printer function and a copy function and optionally a scanner function, a facsimile function, or a file server function.

Exemplary embodiments in which information is printed on a paper medium using a printing apparatus include, but not exclusively, an embodiment in which information is printed on a paper medium using the printer function of a printing apparatus and an embodiment in which information is copied on a paper medium using the copy function of a printing apparatus.

A printing apparatus includes an electronic tag reader that reads information sent from an electronic tag in a medium. The electronic tag reader typically includes only a read function and may include or not include a write function. Any electronic tag reader may be used as long as the electronic tag reader can receive information from an electronic tag.

In an embodiment of the present invention, a repository is, for example, a cabinet in which media can be stored. Cabinets include, for example, a collective post and an individual post. A collective post is, for example, a post that includes a plurality of repositories each of which includes a deposit slot and an extraction slot. In a collective post, for each repository, a destination, i.e., the owner of the repository, is set. An individual post is a post that includes a single repository that includes a deposit slot and an extraction slot. For an individual post, a destination, i.e., the owner of a repository, is set. In an embodiment, an identifier for uniquely identifying a repository is assigned to the repository. The identifier is stored in, for example, an electronic tag reader. In this case, a server system holds the ID of the owner of the repository corresponding to the identifier of the repository in a database therein. In another embodiment, an identifier for identifying the owner of a repository is assigned to the repository.

The aforementioned repository may include, for example, a mechanism that can lock the repository. Mechanisms that can lock include, for example, a physical key type and an electronic key type. However, any type may be adopted as long as a repository can be locked.

A collective post includes an electronic tag reader that reads information sent from an electronic tag for each repository. An individual post includes an electronic tag reader that reads information sent from an electronic tag to the post. The electronic tag reader typically includes only a read function and may include or not include a write function.

A collective post and an individual post each include a computer that manages an electronic tag reader or can be connected to the computer. Alternatively, a collective post and an individual post may each include a transmitter that sends information from an electronic tag reader to a server.

In an embodiment of the present invention, shredders include what is called a paper shredder, what is called a disk shredder, and a combination of them. Any cutting method for a shredder may be adopted as long as paper media, disk media, or a combination of them can be cut. Cutting methods include, for example, straight cut, cross cut, and spiral cut.

A shredder includes an electronic tag reader that reads information sent from an electronic tag. The electronic tag reader typically includes only a read function and may include or not include a write function.

A shredder includes a transmitter that sends information from an electronic tag reader to a server.

In an embodiment of the present invention, a server system may be connected via a network to or via a cable directly to the printing apparatuses, the repositories, and the shredders described above.

An illustrative embodiment of the present invention will now be described in accordance with the drawings. The illustrative embodiment is used to describe the present invention, and it should be understood that there is no intention to limit the scope of the present invention to that described here. Moreover, the same reference numerals denote the same objects throughout the following drawings, except where specifically noted.

FIG. 1A shows the outline of how a client user determines recipient IDs when printing is performed using a printer in an embodiment of the present invention.

Figure 6:
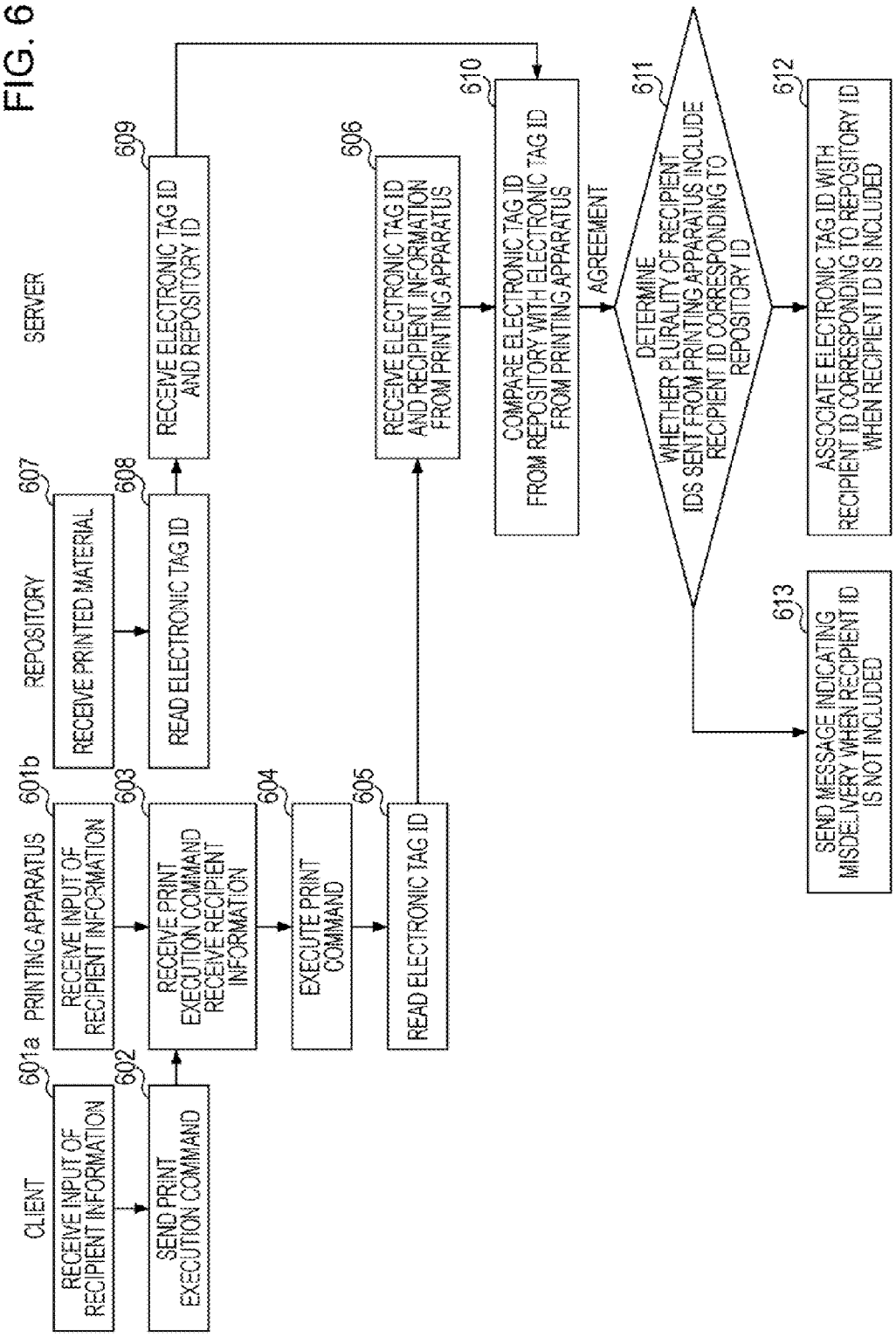
FIG. 6 is a flowchart showing the management of a printed material in an embodiment of the present invention.

For example, a user (102) of a client computer (hereinafter called a client) (101) needs to print three copies so as to distribute, to three persons, paper media on which data (for example, Project X Internal Specification) created using a word processor is printed (hereinafter called printed materials). The user (102) retrieves the print properties of a printer (103) on the screen of the client (101) to perform the aforementioned printing. In an embodiment, a settings screen (104) for print properties includes a button for invoking a menu for specifying the recipient of a printed material (hereinafter called an assign/lend button). When the user (102) clicks the assign/lend button using a mouse, a settings screen (105) for recipient properties is accessed. In another embodiment, the settings screen (104) for print properties includes an assign/lend field for specifying the recipient of a printed material. The user (102) can set a plurality of recipients to which a printed material can be distributed on the settings screen (105) for recipient properties or in the assign/lend field. In an embodiment, the user (102) may select or enter, as the recipient information of a printed material, for example, a user name or an identifier in association with a user name, for example, an employee number. In another embodiment, the user (102) may select or enter, as the recipient information of a printed material, for example, a group name or an identifier in association with a group name. The user (102) may set, as the form of distribution, assignment or lending for each user (refer to the settings screen (105)). Assignment means that the ownership of a printed material is changed from the user (102) who is a print creator to a recipient user (not shown). Lending means that, while the user (102) keeps the ownership of a printed material, the physical storage place of the printed material is changed from a repository for the user (102) to a repository for a recipient user (not shown). When the form of distribution of a printed material is lending, the user (102) may set any lending period for the printed material. Moreover, the user (102) may set whether a printed material is allowed to be disposed of (refer to the description of FIG. 6 given below). On the settings screen (105) for recipient properties in FIG. 1A, a user A is specified as an assignee. This shows that the user A is a recipient of a printed material and the form of distribution is assignment. Moreover, on the settings screen (105), users B and C are specified as borrowers. This shows that the users B and C are recipients of the printed material and the form of distribution is lending.

After the recipients of the printed material are specified, when the client (101) has received a print execution command from the user (102), the client (101) sends, to the printer (103), an assignment/lending user ID list together with the print command for a specific printer and information necessary for printing. The client (101) may further send, to the printer (103), at least one of the following items of printed material information: a print creator, the ID of the print creator, the owner of the printed material, the owner ID of the printed material, print date and time, the purpose of printing, a print origin ID, information indicating whether the printed material is a confidential document, and a subject (however, the printed material information is not limited to these items). Print date and time are date and time when information is printed on paper media. The purpose of printing includes, for example, distribution or proof. A print origin ID is the identifier of the printer (103).

When the printer (103) has received the print command, the printer (103) performs printing on paper media. At the instant when printing is performed, an electronic tag reader included in the printer (103) reads electronic tag IDs from electronic tags in the paper media, on which printing is performed. Under the aforementioned conditions, printing is performed on three paper media. Thus, the electronic tag reader included in the printer (103) reads an electronic tag ID for each of the paper media. In other words, three electronic tag IDs are read. When the aforementioned printing is completed, the printer (103) sends, to a server computer (hereinafter called a server) (106), the assignment/lending user IDs (a list of the assignment/lending user IDs) sent from the client (101) and the read electronic tag IDs (a list of the read electronic tag IDs). The printer (103) may further send, to the server (106), an image of the printed material and at least one of the aforementioned items of the printed material information. The image of the printed material may be generated in, for example, the format of an image file or a Portable Document Format (PDF) (trademark) file. The format of an image file includes, but not exclusively, JPEG format or bitmap format. Printed material information is information obtained from the client (101).

Moreover, when the printer (103) has received the print command, the printer (103) may write, to the electronic tags in the paper media, at least one of the aforementioned items of the printed material information. The at least one of the aforementioned items of the printed material information is written to the electronic tags using the writer function of an electronic tag reader/writer.

The server (106) receives the assignment/lending user ID list and the electronic tag ID list sent from the printer (103) and stores these lists in a storage unit. The storage unit may be included in the server (106) or connected via a cable directly to or via a network to the server (106). The assignment/lending user ID list and the electronic tag ID list are stored in, for example, a database. When the server (106) has stored the assignment/lending user ID list and the electronic tag ID list in the storage unit, the server (106) may send, to the client (101), a message stating that printing is completed.

In the case in FIG. 1A, a printer is used. The same operation applies to a case where, instead of a printer, the print function of a multifunction device is used. Moreover, while the number of printed materials is the same as the number of recipients in the case in FIG. 1A, the number of printed materials may be larger than the number of recipients. Alternatively, the number of printed materials may be smaller than the number of recipients.

FIG. 1B shows a database in a server in an embodiment of the present invention.

Databases (107) and (108) each include a user ID list and an electronic tag ID list. The user ID list includes a plurality of recipient IDs of a printed material specified by the user (102) of the client (101). Each user ID is in association with an ID in association with a repository (a repository ID), for example, an ID for uniquely identifying the repository or the owner ID of the repository (not shown). For example, when a recipient is the user A (a user ID A) and the repository ID of a box (No. 0001) for the user A in a repository a is a0001, the user ID A in the user ID list is in association with the repository ID a0001. Moreover, the ID of a recipient may be the same as the user ID of a repository. A link is established between a user ID list and a corresponding electronic tag ID list.

In an embodiment of the present invention, the user ID list in the database (107) includes the respective user IDs of the users A, B, and C (refer to the settings screen (105) in FIG. 1A). The electronic tag ID list includes electronic tag IDs 000001-001, 000001-002, and 000001-003. In the case in FIG. 1B, a group that includes the users A, B, and C is in association with a group that includes the electronic tag IDs 000001-001, 000001-002, and 000001-003, but the IDs in the user ID list are not individually in association with the IDs in the electronic tag ID list. One of the electronic tag IDs is associated with a corresponding one of the user IDs by filing a printed material in a repository for a corresponding user (refer to FIG. 4A described below).

In another embodiment of the present invention, the user ID list in the database (108) includes the respective user IDs of groups 1, 2, and 3. The electronic tag ID list includes electronic tag IDs 000001-001, 000001-002, and 000001-003. In the case in FIG. 1B, a group that includes the respective user IDs of the groups 1, 2, and 3 is in association with a group that includes the electronic tag IDs 000001-001, 000001-002, and 000001-003, but the IDs in the user ID list are not individually in association with the IDs in the electronic tag ID list. When the group 1 includes users 1, 2, and 3, the users 1, 2, and 3 are in association with the group 1.

Similarly, users 4 and 5 are in association with the group 2, and a user 6 is in association with the group 3. One of the electronic tag IDs is associated with a corresponding one of the user IDs by filing a printed material in a repository for a corresponding user in association with a group.

FIG. 1C shows an exemplary graphical user interface (GUI) in an embodiment of the present invention.

A GUI (108) in FIG. 1C is an exemplary GUI in which the user (102) of the client (101) checks the distribution status of a printed material on the screen of the client (101). The distribution status can be displayed using a GUI. Moreover, the GUI includes a predetermined directory display or folder display, and a printed material is managed in a directory or a folder.

In an embodiment of the present invention, a printed material may be managed in a "Confidential" directory. The "Confidential" directory represents that the printed material is treated as confidential information. The "Confidential" directory includes, for example, "In", "Out", "Lending", "Borrowing", and "Temp" directories.

The "In" directory is a directory for storing a list of printed materials stored in the repository for the user (102).

The "Out" directory is a directory for storing a list of printed materials moved from the repository for the user (102).

The "Lending" directory is a directory for storing a list of printed materials that are lent to third parties by the user (102).

The "Borrowing" directory is a directory for storing a list of printed materials that are borrowed from third parties by the user (102).

The "Temp" directory is a directory for storing a list of printed materials that are not put in any repository. For example, the "Temp" directory stores a list of printed materials that have been printed and have not been distributed.

The "Temp" directory in FIG. 1C further includes an image of a printed material in the server (106). The image of the printed material exists in the "Temp" directory. The printed material in the "Temp" directory has been printed but has not been distributed to any recipient.

A user can cause the content of the printed material to be displayed by clicking the image of the printed material. Only an image of the front cover of the printed material or images of all pages of the printed material may be displayed. Moreover, in the image of the printed material, information showing that a plurality of copies exist may be displayed. Information showing that a plurality of copies exist may be displayed by displaying a plurality of pages so that the pages overlap with each other, as shown in FIG. 1C, or displaying the number of copies in figures in the neighborhood of the image of the printed material.

Moreover, the aforementioned GUI may be displayed on a computer of the owner of a repository.

Figure 2:
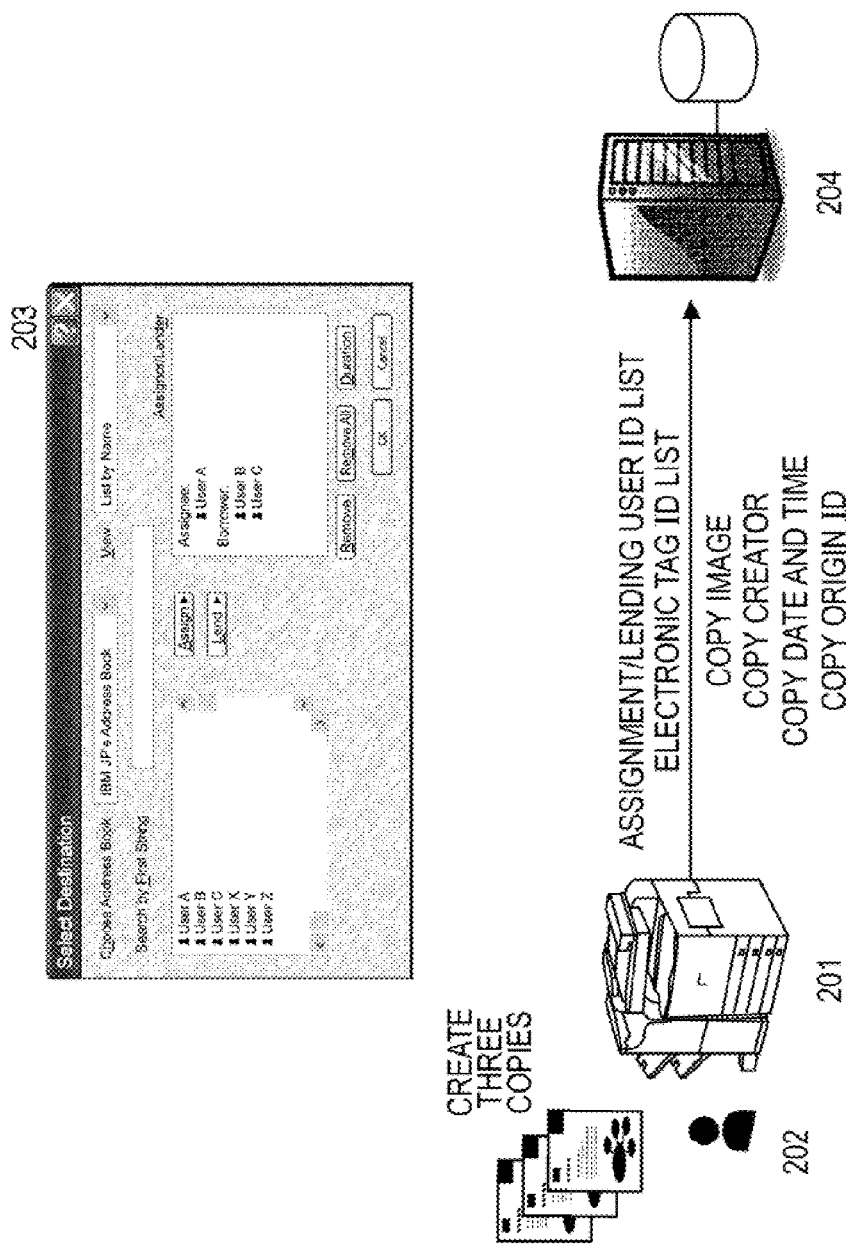
FIG. 2 shows the outline of how a user determines recipient IDs when copies are made using a copier in an embodiment of the present invention.

FIG. 2 shows the outline of how a user determines recipient IDs when copies are made using a copier in an embodiment of the present invention.

For example, a user (202) needs to make three copies using a copier (201) so as to distribute, to three persons, copies of Project X Internal Specification. The copier (201) includes a button for invoking a menu for specifying the recipients of copies (hereinafter called an assign/lend button). When the user (202) presses the assign/lend button or touches the assign/lend button on the screen of the copier (201), a settings screen (203) for recipient properties is accessed. The user (202) can set a plurality of recipients to which copies can be distributed on the settings screen (203) for recipient properties. The user (202) may select or enter, as the recipient information of a copy, for example, a user name or an identifier in association with a user name, for example, an employee number. Moreover, the user (202) may set, as the form of distribution, assignment or lending for each user. Assignment means that the ownership of a copy is changed from the user (202) who is a copy creator to a recipient user (not shown). For example, in the case of assignment, a server computer (hereinafter called a server) (204) changes the owner ID of a medium sent from the copier (201) to a recipient ID corresponding to a repository ID sent from a repository. Lending means that, while the user (202) keeps the ownership of a copy, the physical storage place of the copy is changed from the user (202) to a recipient user (not shown). When the form of distribution is lending, the user (202) may set any lending period for the copy. On the settings screen (203) for recipient properties in FIG. 2, the user A is specified as an assignee. This shows that the user A is a recipient of a copy and the form of distribution is assignment. Moreover, on the settings screen (203), the users B and C are specified as borrowers. This shows that the users B and C are recipients of copies and the form of distribution is lending.

After the recipients of the copies are specified, when the copier (201) has received a copy command from the user (202), the copier (201) makes copies on paper media. At the instant when the copies are made, electronic tag IDs are read from electronic tags in the paper media. Under the aforementioned conditions, the copies are made on three paper media. Thus, an electronic tag reader included in the copier (201) reads an electronic tag ID for each of the paper media. In other words, three electronic tag IDs are read. When the aforementioned copying is completed, the copier (201) sends, to the server (204), the assignment/lending user IDs (a list of the assignment/lending user IDs) and the read electronic tag IDs (a list of the read electronic tag IDs). The copier (201) may further send, to the server (204), a copy image, copy creator information, copy date and time, and a copy origin ID. A copy image may be generated in, for example, the format of an image file or a Portable Document Format (PDF) (trademark) file. Copy creator information is obtained from the copier (201). Copy date and time are date and time when information is copied to paper media. A copy origin ID is the identifier of the copier (201).

Moreover, when the copier (201) has received the copy command, the copier (201) may write, to the electronic tags in the paper media, the following items of information on a copy: a copy creator, the ID of the copy creator, copy date and time, the purpose of copying, and a subject (however, information on a copy is not limited to these items). Information on a copy is written to the electronic tags using the writer function of an electronic tag reader/writer.

The server (204) receives the assignment/lending user ID list and the electronic tag ID list sent from the copier (201) and stores these lists in a storage unit. The assignment/lending user ID list and the electronic tag ID list are stored in, for example, a database. When the server (204) has stored the assignment/lending user ID list and the electronic tag ID list, the server (204) may send, to the copier (201), a message stating that copying is completed.

A database in the server (204) includes a user ID list and an electronic tag ID list. The user ID list includes recipients of copies specified by the user (202). Each user ID is in association with a repository ID (not shown). A repository ID may be an ID unique to a repository or the owner ID of the repository. When an ID unique to each repository is used, the server (204) stores an owner ID corresponding to an ID unique to each repository in the database in advance. The database is the same as that described in the aforementioned description of FIG. 1B.

In the case in FIG. 2, a copier is used. The same operation applies to a case where, instead of a copier, the copy function of a multifunction device is used. Moreover, while the number of copies is the same as the number of recipients in the case in FIG. 2, the number of copies may be larger than the number of recipients. Alternatively, the number of copies may be smaller than the number of recipients.

Figure 3:
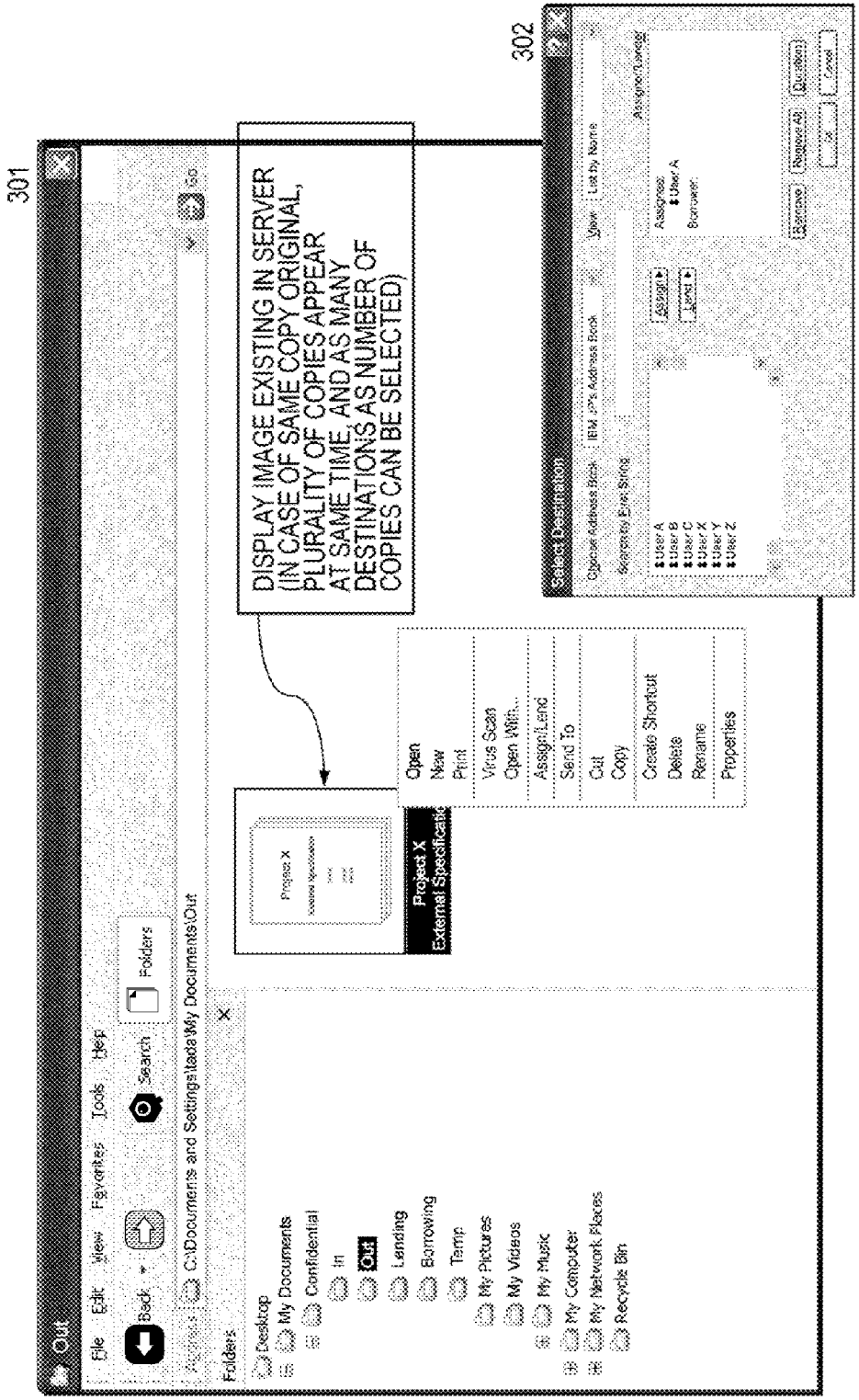
FIG. 3 shows how a recipient is specified from a client using the aforementioned GUI when neither printing nor copying is performed in an embodiment of the present invention.

FIG. 3 shows how a recipient is specified from a client using a GUI when neither printing nor copying is performed in an embodiment of the present invention.

The "Out" directory in a GUI (301) in FIG. 3 includes an image of a printed material that exists in a server. Any recipient of the printed material has not yet been specified. In this state, for example, a user clicks a mouse on the image of the printed material, a recipient of which needs to be specified, to access a settings screen (302) for recipient properties for specifying a recipient.

On the settings screen (302) for recipient properties, the user A is specified as an assignee. When a plurality of printed materials or copies are generated, the user can specify as many recipients as up to the number of the printed materials or copies.

When specification of a recipient has been confirmed, a client sends the confirmed user ID to the server.

The server associates the received user ID with an electronic tag ID list corresponding to the image of the printed material.

FIG. 4A shows the outline of how an electronic tag ID is associated with a user ID by putting a printed material in a repository in an embodiment of the present invention.

A collective post (401) includes a plurality of repositories (mailboxes) that are predetermined recipients. Each of the repositories in the collective post (401) includes an electronic tag reader. The electronic tag readers are connected to a computer managing the collective post (401). Hereinafter, the collective post (401) and the computer managing the collective post (401) are collectively called a collective post, except where specifically noted.

Printed materials are put in the repositories, which are the predetermined recipients, in the collective post (401). In FIG. 4A, it is assumed that predetermined recipients of a printed material are respective repositories managed by the users A, B, and C. When a printed material has been put in the repository for the user A, an electronic tag reader provided in the repository, to which the printed material has been put, reads an electronic tag ID from an electronic tag in the printed material. The computer managing the collective post (401) sends, to a server (402), the read electronic tag ID and an ID in association with the repository (hereinafter called a repository ID). The repository ID may be an ID unique to the repository or the owner ID of the repository (i.e., the ID of the user A). It is assumed that, when an ID unique to each repository is used, the server (402) stores an owner ID corresponding to an ID unique to each repository in a database therein in advance.

The server (402) stores an assignment/lending user ID list (the users A, B, and C) and an electronic tag ID list (000001-001, 000001-002, and 000001-003) sent from a printing apparatus in a storage unit therein. The server (402) determines whether the electronic tag ID read from the printed material put in the collective post (401) exists in the electronic tag ID list sent from the printing apparatus. When the electronic tag ID sent from the collective post (401) exists in the electronic tag ID list sent from the printing apparatus (the electronic tag IDs agree with each other), the server (402) determines in which repository the printed material has been put. When the electronic tag IDs agree with each other, the server (402) determines whether an owner ID corresponding to the repository ID sent from the collective post (401) or an owner ID sent from the collective post (401) exists in the assignment/lending user ID list sent from the printing apparatus. When an owner ID corresponding to the repository ID sent from the collective post (401) or an owner ID sent from the collective post (401) exists in the assignment/lending user ID list sent from the printing apparatus, the server (402) associates the owner ID with the agreed electronic tag ID. When the server (402) has associated the owner ID with the electronic tag ID, the server (402) sends, to a computer for a user X (a print creator), an instruction to display information stating that one of the three printed copies of the printed material has been distributed to a certain user. Alternatively, the computer for the user X (the print creator) may periodically access the server (402) to check the distribution status of the printed material. When the computer for the user X has received the instruction, the computer for the user X displays information stating that the one of the three printed copies of the printed material has been distributed to the certain user (the user A). In particular, the display of the one of the there copies is deleted from the "Temp" directory that appears on the screen of the computer for the user X (403).

Moreover, when the one copy is lent to the user A, the server (402) sends, to the computer for the user X, an instruction to display the one copy in the "Lending" directory (403). When the computer for the user X has received the instruction, the computer for the user X displays the one copy in the "Lending" directory.

The server (402) sends, to a computer for the user A, an instruction to display the one copy in the "In" directory that appears on the screen of the computer for the user A so as to indicate that the aforementioned printed material has been put in the repository for the user A. Alternatively, the computer for the user A may periodically access the server (402) to check the storage status of the repository. When the computer for the user A has received the instruction, the computer for the user A displays the one copy in the "In" directory (404). When the one copy has been put in the "In" directory, the server (402) may send, to the computer for the user A, an instruction to display, on the computer for the user A, a pop-up window indicating that the printed material has been put. When the computer for the user A has received the instruction, the computer for the user A displays the aforementioned pop-up window on the screen.

FIG. 4B shows the outline of how an electronic tag ID is associated with the user ID of a user that belongs to a group by putting a printed material in a repository in an embodiment of the present invention. In the outline, a recipient is a group.

A collective post (411) includes a plurality of repositories that are predetermined recipients. Each of the repositories in the collective post (411) includes an electronic tag reader. The electronic tag readers are connected to a computer managing the collective post (411). Hereinafter, the collective post (411) and the computer managing the collective post (411) are collectively called a collective post, except where specifically noted.

Printed materials are put in the repositories, which are the predetermined recipients, in the collective post (411). In FIG. 4B, it is assumed that predetermined recipients of a printed material are repositories that belong to the group 1. The users 1, 2, and 3 belong to the group 1. When a printed material has been put in a repository for the user 1, an electronic tag reader provided in the repository, to which the printed material has been put, reads an electronic tag ID from an electronic tag in the printed material. The computer managing the collective post (411) sends, to a server (412), the read electronic tag ID and an ID in association with the repository (hereinafter called a repository ID). The repository ID may be an ID unique to the repository or the owner ID of the repository (i.e., the ID of the user 1). It is assumed that, when an ID unique to each repository is used, the server (412) stores a user ID corresponding to an ID unique to each repository in a database therein in advance.

The server (412) stores an assignment/lending user ID list (the groups 1, 2, and 3), an electronic tag ID list (000001-001, 000001-002, and 000001-003), and a list of user IDs included in each group sent from a printing apparatus in a storage unit therein. The server (412) determines whether the electronic tag ID read from the printed material put in the collective post (411) exists in the electronic tag ID list sent from the printing apparatus. When the electronic tag ID sent from the collective post (411) exists in the electronic tag ID list sent from the printing apparatus (the electronic tag IDs agree with each other), the server (412) determines in which repository the printed material has been put. When the electronic tag IDs agree with each other, the server (412) determines whether an owner ID corresponding to the repository ID sent from the collective post (411) or an owner ID sent from the collective post (411) exists in the assignment/lending user ID list sent from the printing apparatus. When an owner ID corresponding to the repository ID sent from the collective post (411) or an owner ID sent from the collective post (411) is a user ID in a group included in the assignment/lending user ID list sent from the printing apparatus, the server (412) associates the identifier of the user 1 corresponding to the owner ID with the agreed electronic tag ID. When the server (412) has associated the identifier of the user 1 corresponding to the owner ID with the electronic tag ID, the server (412) sends, to a computer for the user X (the print creator), an instruction to display information stating that one of the three printed copies of the printed material has been distributed to a certain user. Alternatively, the computer for the user X (the print creator) may periodically access the server (412) to check the distribution status of the printed material. When the computer for the user X has received the instruction, the computer for the user X displays information stating that the one of the three printed copies of the printed material has been distributed to the certain user (the user 1). In particular, the display of the one of the there copies is deleted from the "Temp" directory that appears on the screen of the computer for the user X (413).

Moreover, when the one copy is lent to the user 1, the server (412) sends, to the computer for the user X, an instruction to display the one copy in the "Lending" directory (413). When the computer for the user X has received the instruction, the computer for the user X displays the one copy in the "Lending" directory.

The server (412) sends, to a computer for the user 1, an instruction to display the one copy in the "In" directory that appears on the screen of the computer for the user 1 so as to indicate that the aforementioned printed material has been put in the repository for the user 1. Alternatively, the computer for the user 1 may periodically access the server (412) to check the storage status of the repository. When the computer for the user 1 has received the instruction, the computer for the user 1 displays the one copy in the "In" directory (414). When the one copy has been put in the "In" directory, the server (412) may send, to the computer for the user 1, an instruction to display, on the computer for the user 1, a pop-up window indicating that the printed material has been put. When the computer for the user 1 has received the instruction, the computer for the user 1 displays the aforementioned pop-up window on the screen.

FIG. 4C shows the outline of a case where a printed material is misdelivered and put in a repository in an embodiment of the present invention.

Printed materials are put in repositories in a collective post (421). In FIG. 4C, it is assumed that predetermined recipients of a printed material are respective repositories managed by the users A, B, and C. When a printed material has been put in a repository for a user Z, an electronic tag reader provided in the repository, to which the printed material has been put, reads an electronic tag ID from an electronic tag in the printed material. A computer managing the collective post (421) sends, to a server (422), the read electronic tag ID and an ID in association with the repository (hereinafter called a repository ID). The repository ID may be an ID unique to the repository or the owner ID of the repository (i.e., the ID of the user Z). It is assumed that, when an ID unique to each repository is used, the server (422) stores a user ID corresponding to an ID unique to each repository in a database therein in advance.

The server (422) stores an assignment/lending user ID list (the users A, B, and C) and an electronic tag ID list (000001-001, 000001-002, and 000001-003) sent from a printing apparatus in a storage unit therein. The server (422) determines whether the electronic tag ID read from the printed material put in the collective post (421) exists in the electronic tag ID list sent from the printing apparatus. When the electronic tag ID sent from the collective post (421) exists in the electronic tag ID list sent from the printing apparatus (the electronic tag IDs agree with each other), the server (422) determines in which repository the printed material has been put. When the electronic tag IDs agree with each other, the server (422) determines whether an owner ID corresponding to the repository ID sent from the collective post (421) or an owner ID sent from the collective post (421) exists in the assignment/lending user ID list sent from the printing apparatus. When an owner ID corresponding to the repository ID sent from the collective post (421) or an owner ID sent from the collective post (421) does not exist in the assignment/lending user ID list sent from the printing apparatus, the server (422) determines that the printed material has been misdelivered.

Since one of the three copies of the printed material has been misdelivered, the server (422) sends, to a computer for the user X (423), an instruction to display, in the "Temp" directory that appears on the screen of the computer for the user X, information stating that the one of the three copies has been misdelivered. When the computer for the user X has received the instruction, the computer for the user X displays information stating that the one of the three copies has been misdelivered in the "Temp" directory. The information may be displayed by, for example, a "x" mark.

The server (422) sends, to a computer for the user Z, an instruction to display the one copy in the "In" directory that appears on the screen of the computer for the user Z so as to indicate that the aforementioned printed material has been put in the repository for the user Z. When the computer for the user Z has received the instruction, the computer for the user Z displays the one copy in the "In" directory (424). However, the one copy has been misdelivered and put in the repository, the "x" mark indicating misdelivery is added in the neighborhood of a place where the one copy is displayed.

Figure 4D:
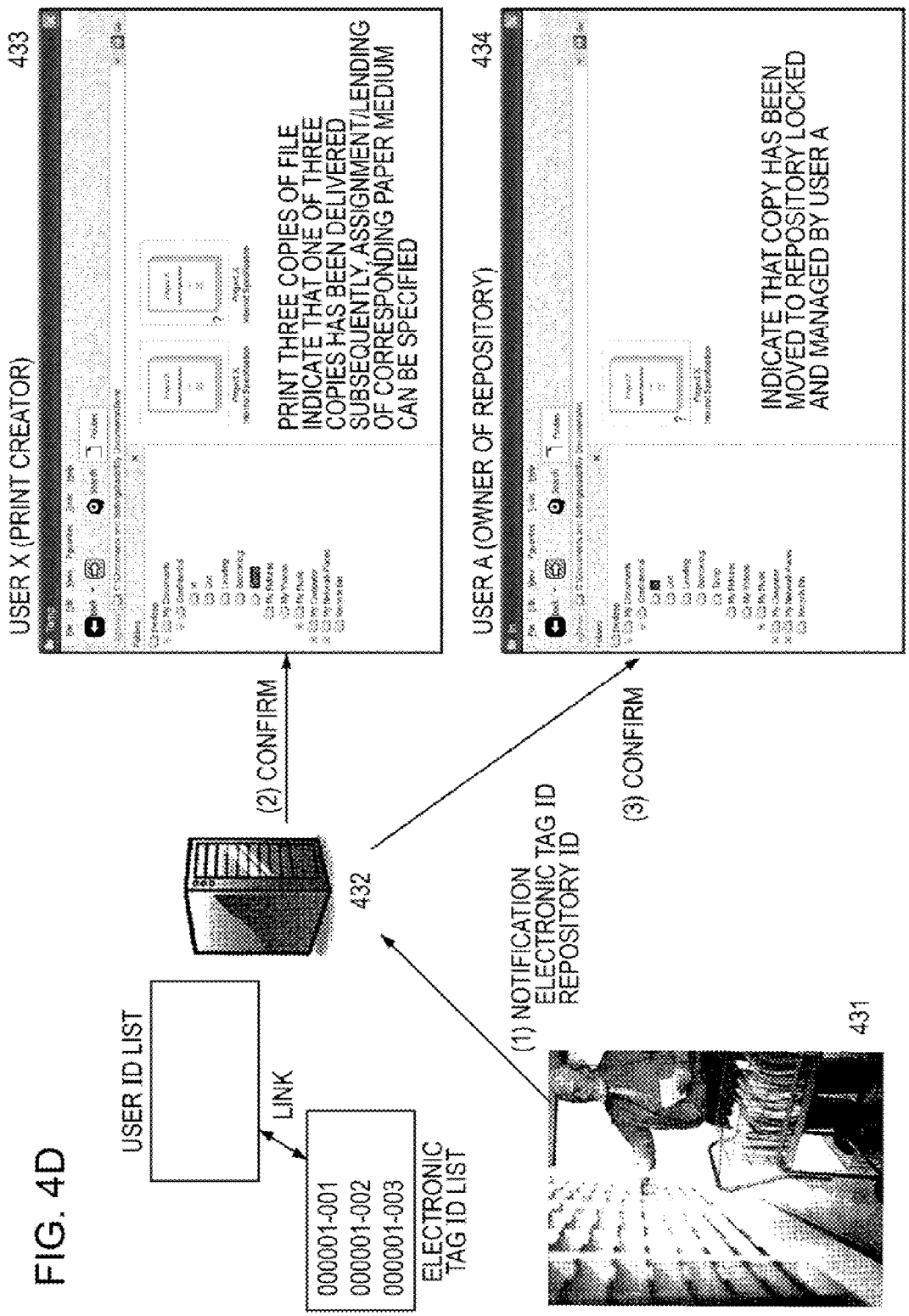
FIG. 4D shows how a recipient is specified from a client using the aforementioned GUI when neither printing nor copying is performed in an embodiment of the present invention.

FIG. 4D shows how a recipient is specified from a client using the aforementioned GUI when neither printing nor copying is performed in an embodiment of the present invention.

A server (432) stores an electronic tag ID list (000001-001, 000001-002, and 000001-003) sent from a printing apparatus in a storage unit therein. However, the server (432) has not yet received any user ID from the printing apparatus.

A printed material is put in a repository that is a predetermined recipient in a collective post (431). In FIG. 4D, it is assumed that a predetermined recipient of a printed material is a repository managed by the user A. When a printed material has been put in the repository for the user A, an electronic tag reader provided in the repository, to which the printed material has been put, reads an electronic tag ID from an electronic tag in the printed material. A computer managing the collective post (431) sends, to the server (432), the read electronic tag ID and an ID in association with the repository (hereinafter called a repository ID). The repository ID may be an ID unique to the repository or the owner ID of the repository (i.e., the ID of the user A). It is assumed that, when an ID unique to each repository is used, the server (432) stores a user ID corresponding to an ID unique to each repository in a database therein in advance.

The server (432) stores the electronic tag ID list sent from the printing apparatus in the storage unit, but does not store any assignment/lending user ID list in the storage unit. This is because, when the printing apparatus has printed the printed material, a user has not created any user ID list.

The server (432) sends, to a computer for the user X who is the print creator of the printed material, an instruction to display information stating that one of the three copies of the printed material has been distributed. When the computer for the user X has received the instruction, the computer for the user X displays information stating that the one of the three copies of the printed material has been distributed (433). The server (432) sends, to a computer for the user A, an instruction to display information stating that the one of the three copies of the printed material has been distributed to the repository for the user A. The computer for the user A who is the owner of the repository displays information stating that the one of the plurality of printed copies of the printed material has been distributed to the repository managed by the user A (434). The information is displayed by, for example, a "?" mark. Subsequently, regarding the printed material, the user X specifies assignment or lending and a user ID to which the printed material is assigned or lent. A client for the user X sends, to the server (432), information indicating assignment or lending and the user ID, to which the printed material is assigned or lent. The server (432) determines whether the user ID sent from the user X agrees with an owner ID corresponding to the repository ID sent from the collective post (431) or an owner ID sent from the collective post (431).

When the user ID agrees with the owner ID, the server (432) associates the aforementioned electronic tag ID with the user ID, which agrees with the owner ID. When the one copy is lent to the user A, the server (432) sends, to the computer for the user X who is the print creator, an instruction to display the one copy in the "Lending" directory. When the computer for the user X has received the instruction, the computer for the user X displays the one copy in the "Lending" directory.

When the server (432) has associated the electronic tag ID with the user ID, the server (432) sends, to the computer for the user A, an instruction to display information stating that the one of the plurality of printed copies of the printed material has been distributed to the user A. When the computer for the user A has received the instruction, the computer for the user A displays information stating that the one of the plurality of printed copies of the printed material has been distributed to the repository for the user A. Since the one of the three copies of the printed material has been distributed to a predetermined user, the server (432) sends, to the computer for the user A, an instruction to display the one of the three copies in the "In" directory that appears on the screen of the computer for the user A. When the computer for the user A has received the instruction, the computer for the user A removes the "?" mark from the display of the one of the three copies of the printed material in the "In" directory. Moreover, when the one copy of the printed material is lent to the user A, the server (432) sends, to the computer for the user A, an instruction to display the one copy in the "Borrowing" directory. When the computer for the user A has received the instruction, the computer for the user A displays an image of the printed material in the "Borrowing" directory. When the one copy of the printed material has been put in the "In" directory, the server (432) may send, to the computer for the user A, an instruction to display, on the computer for the user A, a pop-up window indicating that the printed material has been put. When the computer for the user A has received the instruction, the computer for the user A displays the aforementioned pop-up window on the "In" directory.

On the other hand, when the aforementioned user ID does not agree with the aforementioned owner ID, the server (432) determines that the printed material has been misdelivered.

Figure 5:
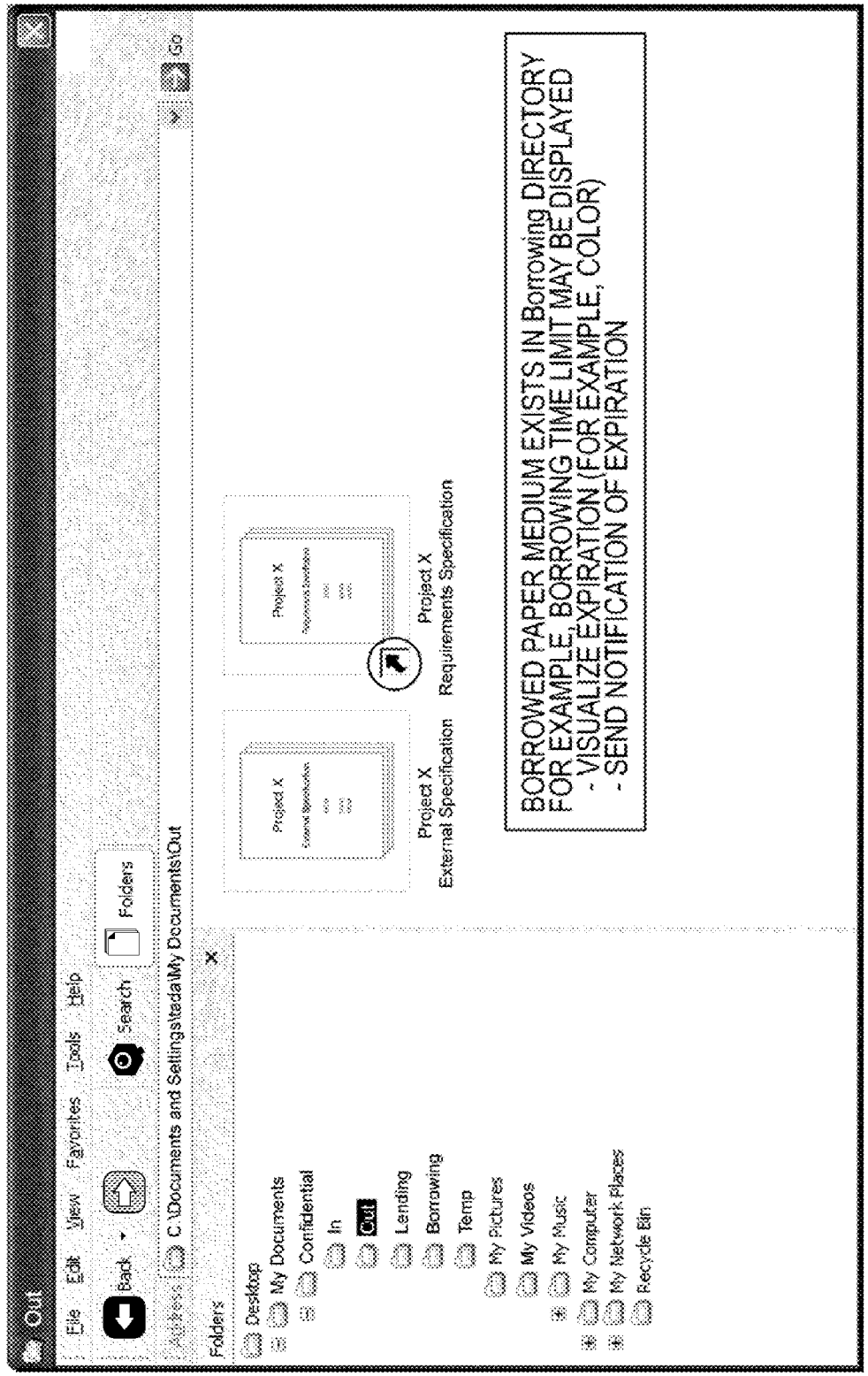
FIG. 5 shows an exemplary GUI that appears on a display unit connected to a computer for a user of a repository in an embodiment of the present invention.

FIG. 5 shows an exemplary GUI that appears on a display unit connected to a computer for a user of a repository in an embodiment of the present invention.

FIG. 5 shows the "Out" directory in the GUI. In the "Out" directory, an image of a printed material (Project X External Specification) retrieved from the repository of the user is displayed. Moreover, in the "Out" directory, an image of a borrowed paper medium (Project X Requirements Specification) is displayed. An arrow at the lower left of the image of Project X Requirements Specification indicates that the image of the borrowed printed material exists in the "Borrowing" directory. A borrowing time limit may be displayed for an image of a printed material that appears in the "Borrowing" directory. Moreover, in the "Borrowing" directory, an image of a printed material that has expired is visualized. Moreover, a notification of expiration is sent to a user of a repository.

FIG. 6 is a flowchart showing the management of a printed material in an embodiment of the present invention.

In an embodiment of the present invention, printing is performed using a printer. A client receives an entry of the recipient information of a printed material from a user (step 601a). The client receives a print command from the user and sends a print execution command to a printing apparatus (step 602). The printing apparatus receives the print execution command and the recipient information from the client (step 603). In response to the print execution command, the printing apparatus prints information on media (step 604).

In another embodiment of the present invention, printing is performed using a copier. A copier receives an entry of the recipient information of a printed material from a user (step 601b). The copier receives a copy execution command from the user (step 603). In response to the copy execution command, the copier prints information on media (step 604).

An electronic tag reader provided in the printing apparatus reads an electronic tag ID from each electronic tag in the printed material (step 605). For example, one electronic tag ID exists for each copy of the printed material. The printing apparatus sends the read electronic tag IDs and the recipient information of the printed material to a server. The server receives the electronic tag IDs and the recipient information of the printed material sent from the printing apparatus (step 606). The received electronic tag IDs are stored in a storage unit, for example, a database, in the server.

When the aforementioned printed material has been put in a repository (step 607), a computer in association with the repository (hereinafter simply called a repository) reads an electronic tag ID from an electronic tag in the printed material (step 608). The repository sends the read electronic tag ID to the server. The repository further sends a repository ID to the server. The server receives the electronic tag ID and the repository ID sent from the repository (step 609).

The server determines whether the electronic tag IDs in the printed material sent from the printing apparatus include the electronic tag ID of the printed material sent from the repository (step 610). When the electronic tag ID of the printed material sent from the repository agrees with one of the electronic tag IDs in the printed material sent from the printing apparatus, the server determines whether a plurality of recipient IDs sent from the printing apparatus include a recipient ID corresponding to the repository ID (step 611). When the electronic tag ID of the printed material sent from the repository does not agree with any one of the electronic tag IDs in the printed material sent from the printing apparatus, the server determines that the printed material put in the repository is not an object to be managed by the server. The server sends a message stating that the printed material put in the repository is not an object to be managed by the server to the client, the printing apparatus, and a compute for a user of the repository, in which the printed material has been put. Then, when the plurality of recipient IDs sent from the printing apparatus include the recipient ID corresponding to the repository ID, the server associates the agreed electronic tag ID with the recipient ID corresponding to the repository ID (step 612). On the other hand, when the plurality of recipient IDs sent from the printing apparatus do not include the recipient ID corresponding to the repository ID, the server determines that the printed material has been distributed to a repository that is not a recipient, i.e., the printed material has been misdelivered. The server sends a message indicating misdelivery to the client, the printing apparatus, and the computer for the user of the repository, in which the printed material has been put (step 613).

Figure 7:
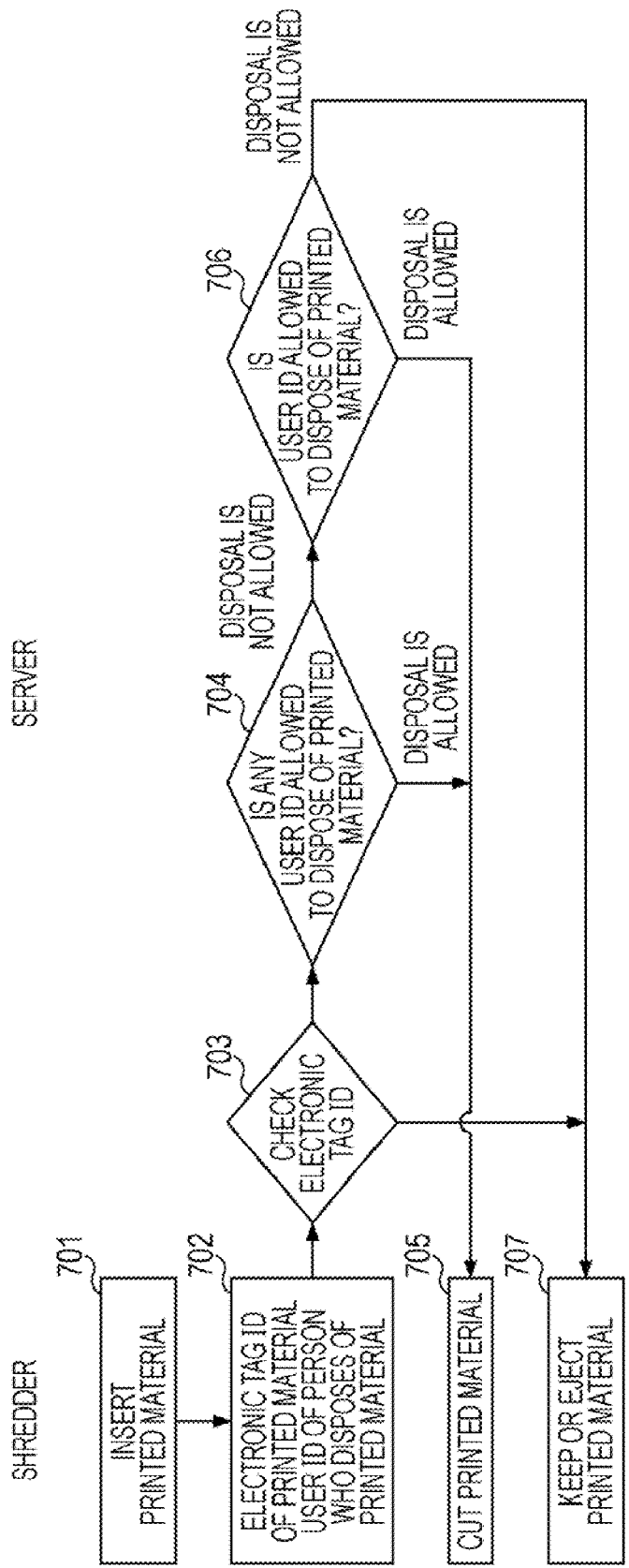
FIG. 7 is a flowchart showing the disposal of a printed material in an embodiment of the present invention.

FIG. 7 is a flowchart showing the disposal of a printed material in an embodiment of the present invention.

The owner of a printed material may set whether the printed material is allowed to be disposed of by a borrower of the printed material or a third party. The settings may be specified on a GUI of a client for the owner or a menu screen of a copier. The client for the owner transfers, to a server, information indicating whether the disposal of the printed material is allowed. This information is stored in a storage unit in the server. Typically, a printed material may be disposed of using a shredder. The disposal process includes at least the cutting of the printed material.

A person who needs to dispose of a printed material inserts the printed material into a shredder (step 701). When the printed material has been inserted into the shredder, an electronic tag reader provided at a slot of the shredder reads an electronic tag ID from an electronic tag in the printed material (step 702). The electronic tag reader further reads the user ID of the person who disposes of the printed material. The user ID of the person who disposes of the printed material is read from, for example, an electronic tag or an IC card attached to the user, or the person who disposes of the printed material directly enters the user ID. The shredder sends, to the server, the user ID of the person who disposes of the printed material and the electronic tag ID of the printed material.

The server determines whether the electronic tag ID sent from the shredder is an electronic tag ID managed by the server (step 703). When the electronic tag ID sent from the shredder is an electronic tag ID managed by the server, the process proceeds to the next step (704). On the other hand, when the electronic tag ID sent from the shredder is an electronic tag ID that is not managed by the server, the server sends, to the shredder, a message stating that the cutting of the printed material is not allowed. When the shredder has received the message, the shredder does not cut the printed material but keeps the printed material in a predetermined place in the shredder or ejects the printed material from a shredding slot (step 707). Keeping the printed material includes, for example, keeping the printed material in the predetermined place and locking the predetermined place. Moreover, while the server checks the owner, the shredder continues keeping the printed material in the predetermined place and locking the predetermined place. The shredder optionally alerts, by screen display or voice, the person who needs to dispose of the printed material that disposal is not allowed.

In step 704, when settings are made so that any user is allowed to dispose of the printed material, the server sends, to the shredder, a message stating that disposal is allowed. When the shredder has received the message stating that disposal is allowed from the server, the shredder starts to cut the printed material (step 705). On the other hand, when the disposal of the printed material is not allowed, the process proceeds to the next step 706.

In step 706, the server determines whether the user ID sent from the shredder is a user ID that is allowed to cut the printed material, with the electronic tag ID, to be cut. In particular, the server makes an inquiry about whether the user ID sent from the shredder is a user ID that is stored in the server and is allowed to cut the printed material, with the electronic tag ID, to be cut. When the user IDs agree with each other, the cutting of the printed material is allowed. Thus, the server sends, to the shredder, a message stating that disposal is allowed. When the shredder has received the message stating that disposal is allowed from the server, the shredder starts to cut the printed material (step 705).

On the other hand, when the disposal of the printed material is not allowed, the server sends, to the shredder, a message stating that the disposal of the printed material is not allowed. When the shredder has received the message stating that the disposal of the printed material is not allowed, the shredder does not cut the printed material but keeps the printed material in the predetermined place in the shredder or ejects the printed material from a shredding slot (step 707). Keeping the printed material includes, for example, keeping the printed material in the predetermined place and locking the predetermined place. Moreover, the server sends, to a computer for the owner of the printed material, a message stating that the printed material has been kept in the predetermined place and the predetermined place has been locked. Moreover, while the server checks the owner, the shredder continues keeping the printed material in the predetermined place and locking the predetermined place. The shredder optionally alerts, by screen display or voice, the person who needs to dispose of the printed material that disposal is not allowed.

The shredder may include a function of erasing information in the electronic tag when cutting the printed material. Alternatively, the shredder may cut the printed material into small pieces so that the electronic tag is cut.

Figure 8:
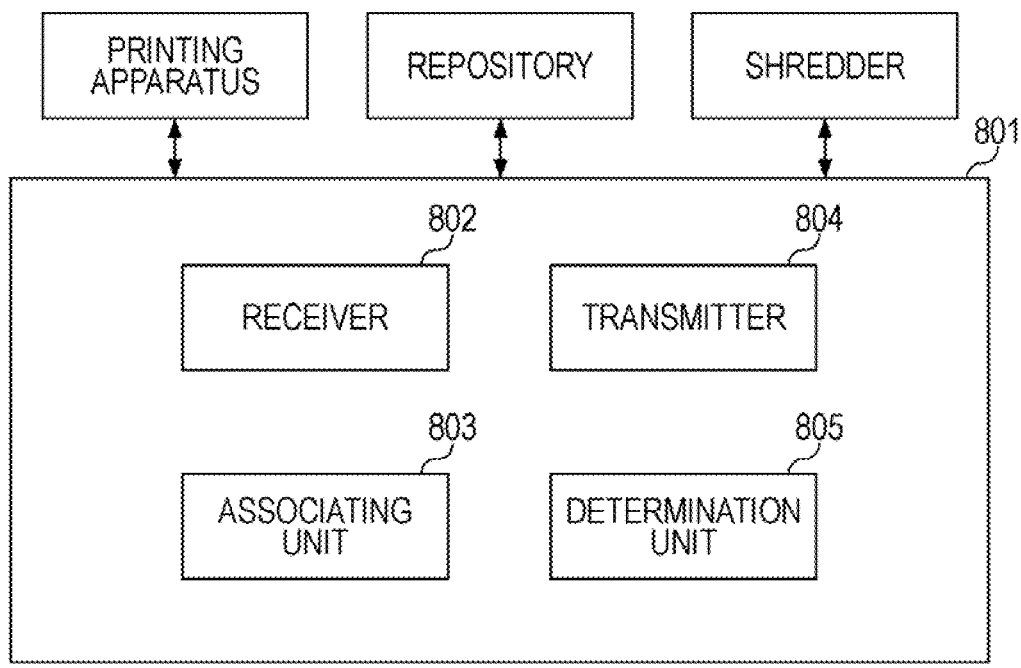
FIG. 8 shows the components of a server system that manages printable media in an embodiment of the present invention.

FIG. 8 shows the components of a server system that manages printable media in an embodiment of the present invention.

A server system (801) includes a receiver (802), a transmitter (804), an associating unit (803), and a determination unit (805).

The receiver (802) receives a plurality of recipient IDs from a printing apparatus. The plurality of recipient IDs are specified by a user when printing is performed. The receiver (802) further receives the respective electronic tag IDs of media from the printing apparatus. Moreover, when a printed material has been put in a repository, the receiver (802) receives the electronic tag ID of an electronic tag in the put printed material and an ID in association with the repository. Moreover, when a printed material has been inserted into a shredder, the receiver (802) receives the electronic tag ID of an electronic tag in the printed material.

The associating unit (803) determines whether the electronic tag IDs of printed materials sent from the printing apparatus include the electronic tag ID of the printed material sent from the repository. When the electronic tag ID of the printed material sent from the repository agrees with one of the electronic tag IDs of the printed materials sent from the printing apparatus, the associating unit (803) determines whether the plurality of recipient IDs sent from the printing apparatus include a recipient ID corresponding to the repository ID. When the plurality of recipient IDs sent from the printing apparatus include the recipient ID corresponding to the repository ID, the associating unit (803) associates the agreed electronic tag ID with the recipient ID corresponding to the repository ID.

When it is determined that a printed material put in a repository is not an object to be managed by the server system (801), the transmitter (804) sends a message stating that the printed material put in the repository is not an object to be managed by the server system (801) to a client, a printing apparatus, and a computer for a user of the repository, to which the printed material has been put. Moreover, when it is determined that a printed material has been distributed to a repository that is not a recipient, the transmitter (804) sends a message indicating misdelivery to a client, a printing apparatus, and a computer for a user of the repository, to which the printed material has been put.

The determination unit (805) determines whether the disposal of a printed material with an electronic tag ID received from a shredder is allowed. The transmitter (804) sends, to the shredder, a message stating that disposal is allowed when disposal is allowed and sends, to the shredder, a message stating that disposal is not allowed when disposal is not allowed.

Figure 9:
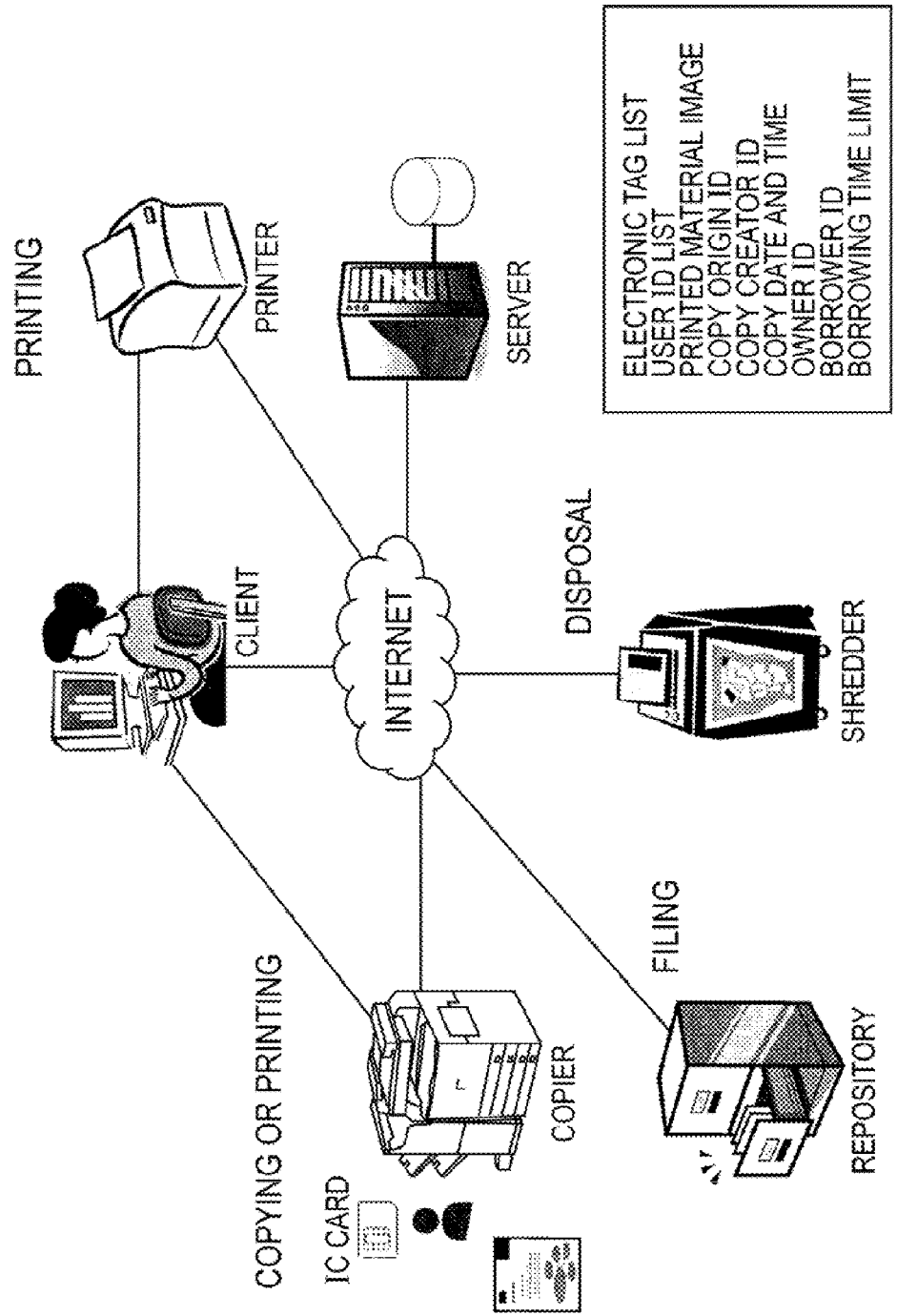
FIG. 9 shows the components of a media management system in an embodiment of the present invention.

FIG. 9 shows the components of a media management system in an embodiment of the present invention.

In an embodiment, a user can print information on media that include electronic tags using, for example, a printer, a multifunction device, or a copier (hereinafter a printing apparatus) via a client computer. In another embodiment, a user can copy information to media that include electronic tags using a multifunction device or a copier. A copier may perform user authentication in which ID cards are used for printing or copying, as necessary.

A printing apparatus includes an electronic tag reader, and the electronic tag reader can read an electronic tag ID from a medium at the instant when printing or copying is performed.

A repository includes an electronic tag reader, and when a printed material has been put in the repository, the electronic tag reader can read the electronic tag ID of an electronic tag in the printed material.

A shredder includes an electronic tag reader, and when a printed material has been inserted into the shredder, the electronic tag reader can read the electronic tag ID of an electronic tag in the printed material.

A server may be connected via the Internet or an intranet to or via a cable directly to a client computer, a printing apparatus, a repository, and a shredder. Moreover, the server receives, from the printing apparatus, an electronic tag list, a user ID list, a printed material image, a copy origin ID, a copy creator ID, copy date and time, a repository ID, a borrower ID, and a borrowing time limit. The server further receives, from the repository, an electronic tag ID and a repository ID or an owner ID corresponding to the repository ID. The server further receives, from the shredder, an electronic tag ID and a user ID.

A computer (a server or a client) used in the embodiments of the present invention includes a CPU and a main memory, and these components are connected to a bus. The CPU is preferably based on the 32-bit or 64-bit architecture. For example, Xeon® series, Core® series, Pentium® series, or Celeron® series of Intel Corporation, or Phenom® series or Athlon® series of AMD, Inc. can be used as the CPU. A display such as an LCD monitor is connected to the bus via a display controller. The display is used to, for the management of a computer system, display information on the computer connected to a network via a communication line and information on software running on the computer, using an appropriate graphic interface. Moreover, a hard disk or a silicon disk and a CD-ROM drive, a DVD drive, or a Blu-ray drive (BD) are connected to the bus via an IDE controller or an SATA controller.

An operating system, programs for providing a Java® processing environment such as J2EE, middleware, application programs, an operational management program, and other programs and pieces of data are stored in the hard disk so that they can be loaded into the main memory.

The CD-ROM drive, the DVD drive, or the BD drive is used to additionally install programs from a CD-ROM, a DVD-ROM, or a BD into the hard disk as necessary. Moreover, a keyboard and a mouse are connected to the bus via a keyboard/mouse controller.

The communication interface is based on, for example, the Ethernet (trademark) Protocol and is connected to the bus via a communication controller. The communication interface plays a role that physically connects the computer to the communication line and provides the network interface layer in the TCP/IP communication protocol of the communication function of the operating system of the computer. In this case, the communication line may be implemented in a wired LAN environment or a wireless LAN environment based on a wireless LAN connection standard such as IEEE 802.11a/b/g/n.

Available network connection units that establish a connection of hardware such as computers are not limited to the aforementioned network switch but include, for example, a router and a hardware management console. In other words, these units include a function of, in response to an inquiry using a predetermined command from a computer in which a network operational management program is installed, returning the configuration information of computers connected to these units, such as IP addresses and MAC addresses. Each of the network switch and the router includes an Address Resolution Protocol (ARP) table that includes a list of pairs of the IP addresses of computers connected to each of the network switch and the router and corresponding MAC addresses for the ARP and includes a function of returning the content of the ARP table in response to an inquiry using a predetermined command. The hardware management console can return the configuration information of computers that is more detailed than the ARP table.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Each embodiment was chosen and described in order to best explain the principles of the invention and the practical application, and to enable others of ordinary skill in the art to understand the invention for various embodiments with various modifications as are suited to the particular use contemplated.

We claim:

1. A server system that manages a printable medium including an electronic tag, the server system comprising:
   a first receiver that, when information has been printed on the medium using a printing apparatus, receives, from the printing apparatus, an electronic tag ID of an electronic tag in the printed medium and a plurality of recipient IDs specified by a user;
   a second receiver that, when the printed medium has been stored in a repository, receives, from the repository, an electronic tag ID of an electronic tag in the stored medium and a repository ID associated with the repository;
   an associating unit that compares the electronic tag ID received from the printing apparatus to the electronic tag ID received from the repository, and, when the electronic tag ID received from the printing apparatus agrees with the electronic tag ID received from the repository, determines whether the plurality of recipient IDs received from the printing apparatus includes a recipient ID corresponding to the repository ID received from the repository; and
   a transmitter that, when the plurality of recipient IDs received from the printing apparatus do not include a recipient ID corresponding to the repository ID received from the repository, sends a message indicating misdelivery to at least one of the printing apparatus, a computer in association with the user who has performed the printing, and a computer for an administrator in association with the repository.

2. The server system according to claim 1, further comprising:
   a third receiver that, when the medium has been inserted into a shredder, receives an electronic tag ID in the medium from the shredder;
   a determination unit that determines whether disposal of the medium with the received electronic tag ID is allowed; and
   a transmitter that sends, to the shredder, a message stating that the disposal is allowed when the disposal is allowed and sends, to the shredder, a message stating that the disposal is not allowed when the disposal is not allowed.

3. The server system according to claim 1, wherein one of the recipient IDs sent from the printing apparatus includes a flag indicating that the printed medium is assigned or lent to a user of the recipient repository.

4. The server system according to claim 3, wherein the first receiver receives an owner ID of the medium from the printing apparatus.

5. The server system according to claim 4, wherein, when a flag indicating that the printed medium is assigned to the user of the recipient repository is included, the associating unit replaces the owner ID of the medium sent from the printing apparatus with the recipient ID corresponding to the repository ID sent from the repository.

6. A media management system that manages a printable medium including an electronic tag, the media management system comprising:
   a printing apparatus that includes a transmitter that, when information has been printed on the medium, sends, to a server system, an electronic tag ID of an electronic tag in the printed medium and a plurality of recipient IDs specified by a user; and
   a repository that stores the printed medium, that includes a reader for reading an electronic tag ID from an electronic tag in the stored medium, and that includes a transmitter for sending, to the server system, the read electronic tag ID and a repository ID associated with the repository,
   wherein the server system includes an associating unit that compares the electronic tag ID received from the printing apparatus to the electronic tag ID received from the repository, and, when the electronic tag ID received from the printing apparatus agrees with the electronic tag ID received from the repository, determines whether the plurality of recipient IDs received from the printing apparatus includes a recipient ID corresponding to the repository ID received from the repository; and
   wherein the server system further includes a transmitter that, when the plurality of recipient IDs received from the printing apparatus do not include the recipient ID corresponding to the repository ID received from the repository, sends a message indicating misdelivery to at least one of the printing apparatus, a computer in association with the user who has performed the printing, and a computer for an administrator in association with the repository.

7. The media management system according to claim 6, further comprising a shredder,
   wherein the shredder includes a transmitter that, when the medium has been inserted into the shredder, sends an electronic tag ID in the medium to the server system,
   wherein the server system further includes
   a determination unit that receives the electronic tag ID sent from the shredder and determines whether disposal of the medium with the received electronic tag ID is allowed, and
   a transmitter that sends, to the shredder, a message stating that the disposal is allowed when the disposal is allowed and sends, to the shredder, a message stating that the disposal is not allowed when the disposal is not allowed,
   wherein the shredder cuts the inserted medium upon receiving the message stating that the disposal is allowed and does not cut the inserted medium upon receiving the message stating that the disposal is not allowed.

8. The media management system according to claim 6, wherein the printing apparatus further includes a setting unit that allows an owner of the medium to set whether disposal of the medium is allowed.

9. The media management system according to claim 6, wherein the repository further includes a setting unit that allows an owner in association with the repository to set whether disposal of the medium is allowed.

10. The media management system according to claim 6, wherein one of the recipient IDs sent from the printing apparatus includes a flag indicating that the printed medium is subjected to assignment or lending.

11. The media management system according to claim 6, wherein the transmitter in the printing apparatus further sends, to the server system, at least one of a name of the user who has performed the printing, a user ID of the user who has performed the printing, print date and time, an ID of the printing apparatus, and a lending period of the printed medium.

12. The media management system according to claim 6, wherein the printing apparatus further includes a receiver that receives the plurality of recipient IDs specified by the user from a client computer that may be connected to the printing apparatus.

13. The media management system according to claim 6, wherein the printing apparatus further includes an imaging unit that images the printed information, and the transmitter therein further sends the imaged information to the server system.

14. The media management system according to claim 6, wherein the printing apparatus further includes an input unit that allows specification of a plurality of recipients to which the medium is distributed.

15. The media management system according to claim 6, wherein the printing apparatus is a printer, a copier, or a multifunction device.

16. A method, embodied in a server system, in which the server system performs the following steps to manage a printable medium that includes an electronic tag, the method comprising:

receiving, when information has been printed on the medium using a printing apparatus, from the printing apparatus, an electronic tag ID of an electronic tag in the printed medium and a plurality of recipient IDs specified by a user;

receiving, when the printed medium has been stored in a repository, from the repository, an electronic tag ID of an electronic tag in the stored medium and a repository ID associated with the repository; and comparing the electronic tag ID received from the printing apparatus to the electronic tag ID received from the repository, and, when the electronic tag ID received from the printing apparatus agrees with the electronic tag ID received from the repository, determines whether the plurality of recipient IDs received from the printing apparatus includes a recipient ID corresponding to the repository ID received from the repository; and sending, when the plurality of recipient IDs received from the printing apparatus do not include the recipient ID corresponding to the repository ID received from the repository, a message indicating misdelivery to at least one of the printing apparatus, a computer in association with the user who has performed the printing, and a computer for an administrator in association with the repository.

17. The method according to claim 16, further comprising:

receiving, when the medium has been inserted into a shredder, an electronic tag ID in the medium from the shredder;

determining whether disposal of the medium with the received electronic tag ID is allowed; and sending, to the shredder, a message stating that the disposal is allowed when the disposal is allowed and sending, to the shredder, a message stating that the disposal is not allowed when the disposal is not allowed.

18. A method for managing a printable medium including an electronic tag in a system that manages the medium, the method comprising:

sending, by a printing apparatus to a server system when information has been printed on the medium by the printing apparatus, an electronic tag ID of an electronic tag in the printed medium and a plurality of recipient IDs specified by a user;

sending, to the server system by a repository that stores the printed medium and reads an electronic tag ID from an electronic tag in the stored medium, the read electronic tag ID and a repository ID associated with the repository; and comparing, by the server system, the electronic tag ID received from the printing apparatus to the electronic tag ID received from the repository, and, when the electronic tag ID received from the printing apparatus agrees with the electronic tag ID received from the repository, determining whether the plurality of recipient IDs received from the printing apparatus includes a recipient ID corresponding to the repository ID received from the repository; and sending, by the server system when the plurality of recipient IDs received from the printing apparatus does not include the recipient ID corresponding to the repository ID received from the repository, a message indicating misdelivery to at least one of the printing apparatus, a computer in association with the user who has performed the printing, and a computer for an administrator in association with the repository.

19. The method according to claim 18, further comprising:

sending, by a shredder that cuts the medium, when the medium has been inserted into the shredder, an electronic tag ID in the medium to the server system;

receiving, by the server system, the electronic tag ID sent from the shredder and determining whether disposal of the medium with the received electronic tag ID is allowed;

sending, by the server system to the shredder, a message stating that the disposal is allowed when the disposal is allowed;

sending, by the server system to the shredder, a message stating that the disposal is not allowed when the disposal is not allowed;

cutting the inserted medium, by the shredder upon receiving the message stating that the disposal is allowed; and ejecting, by the shredder, the inserted medium upon receiving the message stating that the disposal is not allowed.

20. A computer program product for managing a printable medium including an electronic tag, comprising:

a non-transitory computer readable storage medium having program code stored thereon, the computer program code comprising program code for, when information has been printed on the medium using a printing apparatus, receiving, from the printing apparatus, an electronic tag ID of an electronic tag in the printed medium and a plurality of recipient IDs specified by a user, program code for, when the printed medium has been stored in a repository, receiving, from the repository, an electronic tag ID of an electronic tag in the stored medium and a repository ID associated with the repository, program code for comparing the electronic tag ID received from the printing apparatus to the electronic tag ID received from the repository, and, when the electronic tag ID received from the printing apparatus agrees with the electronic tag ID received from the repository, determining whether the plurality of recipient IDs received from the printing apparatus includes a recipient ID corresponding to the repository ID sent from the repository; and program code for sending, when the plurality of recipient IDs received from the printing apparatus does not include the recipient ID corresponding to the repository ID received from the repository, a message indicating misdelivery to at least one of the printing apparatus, a computer in association with the user who has performed the printing, and a computer for an administrator in association with the repository.

21. The computer program product of claim 20, the computer program code stored on the computer readable storage medium further comprising:
program code for, when the medium has been inserted into a shredder, receiving an electronic tag ID in the medium from the shredder,
program code for determining whether disposal of the medium with the received electronic tag ID is allowed, and
program code for sending, to the shredder, a message stating that the disposal is allowed when the disposal is allowed and sending, to the shredder, a message stating that the disposal is not allowed when the disposal is not allowed.

* * * * *